(12) United States Patent
Gifford et al.

(10) Patent No.: US 7,810,483 B2
(45) Date of Patent: Oct. 12, 2010

(54) RAIL GUIDE WITH BEARINGS FOR TILE SAW

(75) Inventors: Robert H. Gifford, New Freedom, PA (US); David Charles Campbell, Bel Air, MD (US); Jason Carl McRoberts, Red Lion, PA (US); Brent Austin Kuehne, Red Lion, PA (US); Micah Alan Coleman, Baltimore, MD (US); Michael Frederick Cannaliato, Bel Air, MD (US); Terry L. Turner, Towson, MD (US)

(73) Assignee: Black & Decker Inc., Towson, MD (US)

( * ) Notice: Subject to any disclaimer, the term of this patent is extended or adjusted under 35 U.S.C. 154(b) by 444 days.

(21) Appl. No.: 11/843,269

(22) Filed: Aug. 22, 2007

(65) Prior Publication Data
US 2008/0295822 A1  Dec. 4, 2008

Related U.S. Application Data

(60) Provisional application No. 60/941,941, filed on Jun. 4, 2007.

(51) Int. Cl.
B25D 1/04 (2006.01)
B24B 7/00 (2006.01)
(52) U.S. Cl. .................. 125/13.01; 451/127; 451/160
(58) Field of Classification Search .............. 125/13.01; 384/46, 52, 58; 451/124, 127, 150, 160
See application file for complete search history.

(56) References Cited

U.S. PATENT DOCUMENTS

| 2,258,177 | A | * | 10/1941 | Edwards | 384/13 |
|---|---|---|---|---|---|
| 2,349,957 | A | * | 5/1944 | Greve | 384/52 |
| 2,807,123 | A | * | 9/1957 | Palmer | 451/153 |
| 2,983,553 | A | * | 5/1961 | Dexter | 384/52 |
| 3,347,603 | A | * | 10/1967 | Ignatjev | 384/52 |
| 3,634,975 | A | * | 1/1972 | Hensley | 451/127 |
| 4,375,195 | A | * | 3/1983 | Tsuboi | 104/246 |
| 4,428,159 | A | | 1/1984 | Sigetich | |
| 4,446,845 | A | | 5/1984 | Harding | |
| 4,944,608 | A | * | 7/1990 | Osawa | 384/58 |
| 4,962,685 | A | | 10/1990 | Hagstrom | |
| 4,966,257 | A | * | 10/1990 | Axthammer | 188/322.17 |
| 5,156,463 | A | * | 10/1992 | Zaguroli, Jr. | 384/53 |
| 5,172,680 | A | | 12/1992 | Swan | |
| 5,560,274 | A | * | 10/1996 | Turner | 83/886 |

(Continued)

FOREIGN PATENT DOCUMENTS

DE       2 202 376 A       1/1972

(Continued)

*Primary Examiner*—Maurina Rachuba
(74) *Attorney, Agent, or Firm*—Shook, Hardy & Bacon L.L.P.

(57) ABSTRACT

A tile cutting machine includes a tool support assembly having at least one rail with a rail bearing associated therewith for selective movement there along. The rail bearing includes a housing having a bore therethrough. A plurality of slots are located in the housing adjacent the bore. The slots receive an axle pin having a wheel thereon to provide a roller bearing. Portions of the wheels extend into the bore and ride along an outer surface of the rail when it is received in the bore.

11 Claims, 25 Drawing Sheets

U.S. PATENT DOCUMENTS

| | | |
|---|---|---|
| 5,676,124 A | 10/1997 | Lee |
| RE35,666 E | 11/1997 | Smith |
| 5,741,175 A | 4/1998 | Voege |
| 5,797,307 A | 8/1998 | Horton |
| D400,896 S | 11/1998 | Hepworth |
| 5,915,840 A * | 6/1999 | Zaguroli et al. ............... 384/53 |
| D427,213 S | 6/2000 | Chen |
| 6,119,676 A | 9/2000 | Greenland |
| 6,152,127 A | 11/2000 | Fuhrman |
| D442,977 S | 5/2001 | Howard |
| 6,263,866 B1 | 7/2001 | Tsao |
| 6,272,961 B1 | 8/2001 | Lee |
| 6,283,110 B1 | 9/2001 | Lee |
| D453,170 S | 1/2002 | Smith |
| 6,347,624 B1 | 2/2002 | Smith |
| 6,427,677 B1 | 8/2002 | O'Banion |
| 6,439,218 B1 | 8/2002 | Hulett |
| 6,457,469 B1 * | 10/2002 | Mueller et al. ........... 125/23.01 |
| 6,494,198 B1 | 12/2002 | Chen |
| 6,508,244 B2 | 1/2003 | Lee |
| 6,637,424 B1 | 10/2003 | Fuhrman |
| 6,672,188 B2 | 1/2004 | Lee |
| 6,679,244 B1 | 1/2004 | Tsao |
| 6,752,139 B2 | 6/2004 | Lee |
| 6,752,140 B1 | 6/2004 | Fuhrman |
| D492,706 S | 7/2004 | Hepworth |
| 6,845,768 B2 | 1/2005 | O'Banion |
| 6,874,399 B2 | 4/2005 | Lee |
| 6,880,543 B2 | 4/2005 | Bradfield |
| D508,928 S | 8/2005 | Chen |
| 6,932,073 B2 | 8/2005 | Zhang |
| 6,932,074 B2 | 8/2005 | Cheng |
| 6,959,632 B2 | 11/2005 | Lee |
| 6,976,764 B2 | 12/2005 | Cheng |
| 6,978,707 B2 | 12/2005 | Lee |
| 7,021,305 B2 | 4/2006 | Lee |
| 7,028,683 B1 | 4/2006 | Chen |
| 7,066,627 B1 | 6/2006 | Chen |
| 7,387,120 B2 * | 6/2008 | O'Banion et al. ......... 125/23.02 |
| 2002/0124841 A1* | 9/2002 | O'Banion et al. ......... 125/13.01 |
| 2002/0168121 A1* | 11/2002 | Iida ............................ 384/58 |
| 2004/0134324 A1 | 7/2004 | Sheddy |
| 2004/0261592 A1 | 12/2004 | Chen |
| 2005/0016631 A1 | 1/2005 | Zhang |
| 2005/0051015 A1 | 3/2005 | Zhang |
| 2005/0126363 A1 | 6/2005 | Sheddy |
| 2005/0126555 A1 | 6/2005 | Sheddy |
| 2005/0193883 A1* | 9/2005 | Sheddy et al. ................. 83/581 |
| 2006/0213341 A1 | 9/2006 | Hogan |
| 2008/0216808 A1* | 9/2008 | O'Banion et al. ......... 125/13.01 |

FOREIGN PATENT DOCUMENTS

| | | |
|---|---|---|
| DE | 35 43 724 C2 | 12/1985 |
| DE | 195 14 168 A1 | 4/1995 |
| DE | 198 56 336 A1 | 12/1998 |
| EP | 0 523 010 B1 | 10/1992 |
| EP | 1 500 463 A2 | 1/2005 |
| EP | 1 693 170 A1 | 2/2006 |
| GB | 2 333 480 A | 3/1998 |

* cited by examiner

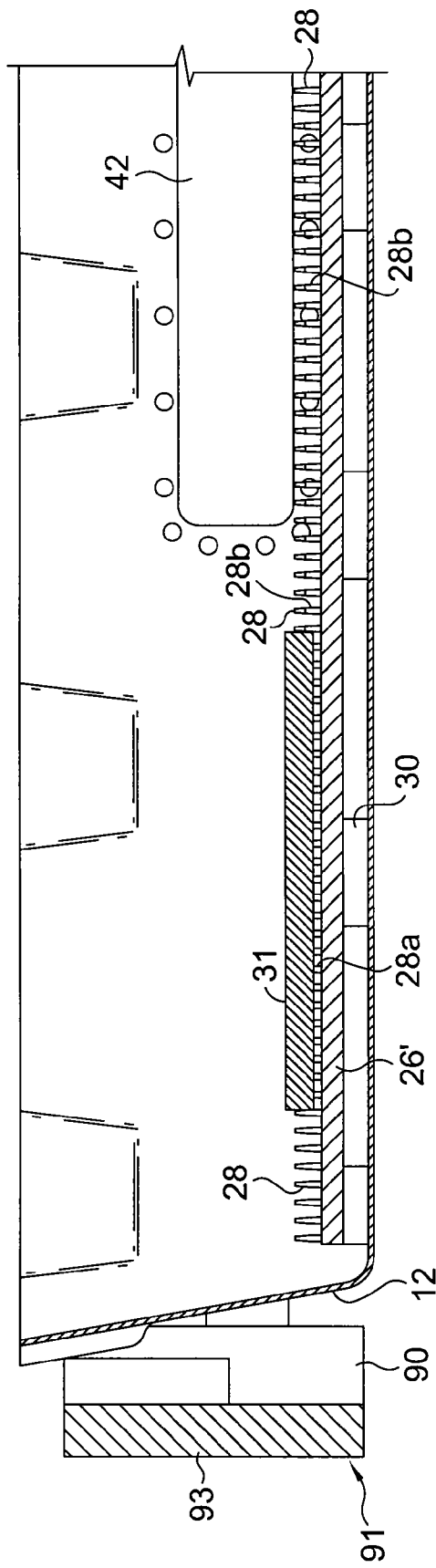
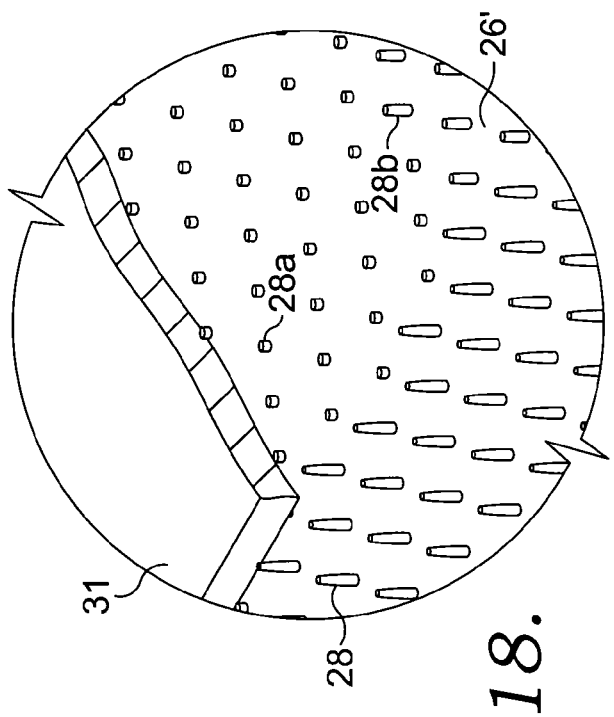
FIG. 17.
FIG. 18.

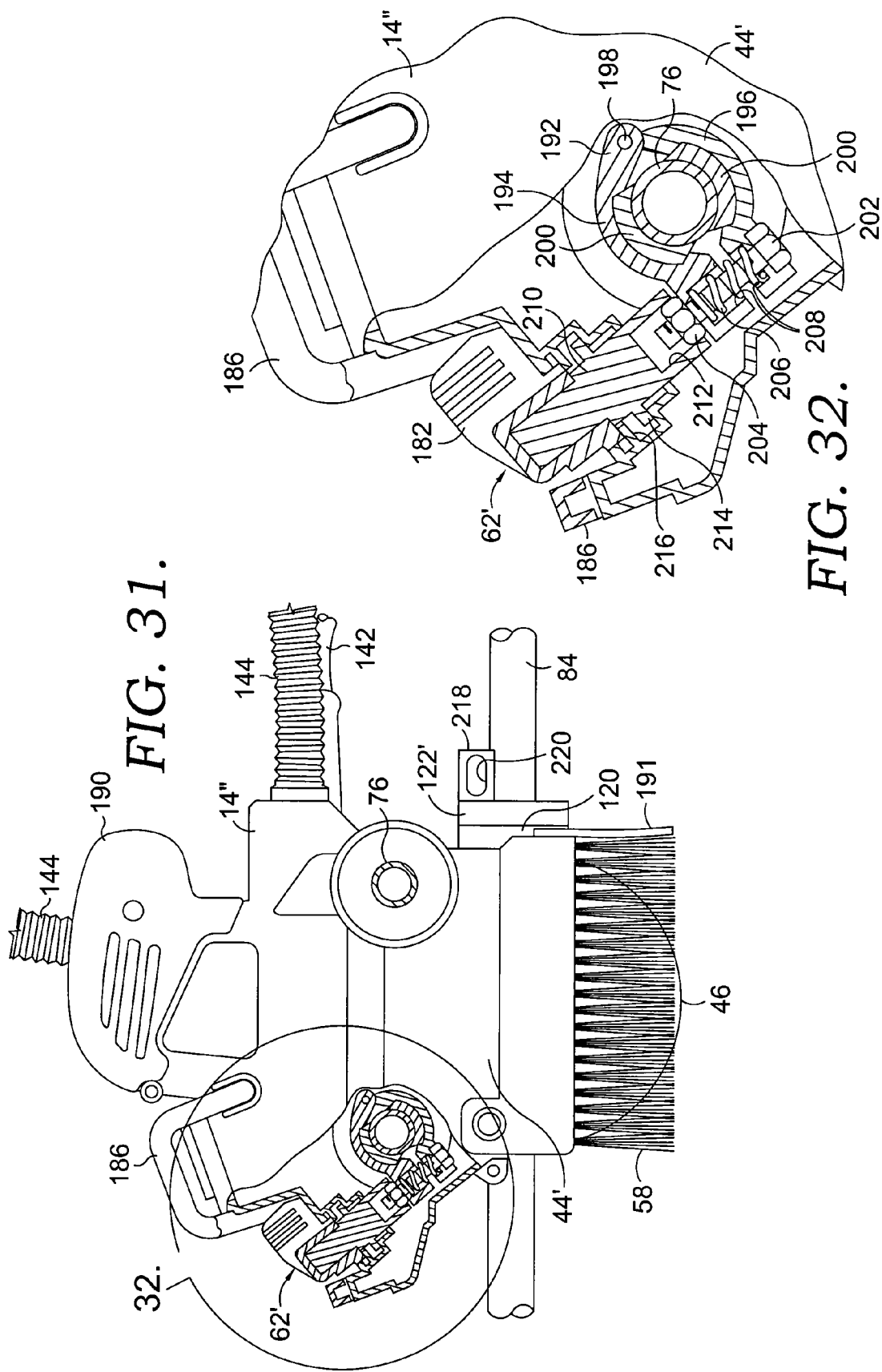

RAIL GUIDE WITH BEARINGS FOR TILE SAW

CROSS-REFERENCE TO RELATED APPLICATIONS

This application claims the benefit of and priority to commonly owned U.S. Provisional Application Ser. No. 60/941,941, filed Jun. 4, 2007, which is hereby incorporated by reference in its entirety.

STATEMENT REGARDING FEDERALLY SPONSORED RESEARCH OR DEVELOPMENT

Not applicable.

TECHNICAL FIELD

The present invention relates generally to a tile cutting machine. More particularly, embodiments of the present invention relate to a tile cutting machine having a cutting head assembly movable relative to a tub containing water and a holding mat with nubs for supporting a tile to be cut, wherein a blade of the cutting head assembly is positioned at a depth that allows full penetration through the tile and into contact with water received within the tub.

BACKGROUND

Because of their durability, affordability, and aesthetic qualities, tiles are commonly used in a wide variety of finishing applications. For instance, tiles are often used for covering roofs, floors, and walls. Additionally, tiles may be used to construct countertops and tabletops.

At the time of installation, a tile installer must trim tiles to fit the edges of the installation site. As an example, when installing tiles as a floor covering, the installer must cut tiles along the edges of the room to fit the room's dimensions. A variety of portable tile cutting tools are available that allow the installer to cut tiles to the dimensions needed at the installation site. Simple tile cutting tools include hand tools, such as tile nibbers, for instance, which are a specialty tool shaped similar to pliers and are used to nibble away at a tile in order to cut and shape it. Another simple tile cutting tool is a tile cutter that uses a scoring wheel to score the tile along a line. The user may then snap the tile along the score line. However, cutting tiles using these simple types of cutting tools may be difficult and time-consuming. For instance, a user may find it difficult to cut tiles using these tools without breaking the tiles. Additionally, these types of cutting tools may not be suitable for cutting tiles of certain materials.

For larger tile installations and to save time and effort, a tile installer may use a wet tile saw to cut tiles. A wet tile saw typically uses a wide, circular blade with sand crystals or diamonds to cut a tile by grinding a channel through the tile. Water is splashed on the blade to control dust, cool the blade, and reduce friction while cutting. However, currently available wet tile saws present a number of drawbacks. For instance, wet tile saws may be difficult to operate and intimidating, especially to novice tile installers, such as do-it-yourselfers. Additionally, wet tile saws are often cumbersome and difficult to clean. Further, a water pump is typically used to draw water from a water supply and splash the blade while cutting. Splashing a blade in this manner is messy as a result of water being sprayed all over and leads to water loss. The water pump also adds an additional item that must be cleaned and maintained. Further still, the user generally must move the tile through the stationary saw blade. As the tile is being moved, it can easily shift out of alignment, resulting in a miss-cut tile.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to a tile cutting machine. In one aspect, a tile cutting machine includes a tub having four walls and a bottom for receiving water. A holding mat having a number of nubs for supporting a tile to be cut is received within the tub. A cutting head assembly is movable relative to the tub and includes a blade and a motor for driving the blade. The blade is positioned at a depth that allows full penetration through the tile and into contact with water received within the tub.

In another aspect, an embodiment is directed to a tile cutting machine that includes a tub having four walls and a bottom for receiving water and a holding mat having a number of nubs for supporting a tile to be cut. A rail assembly that includes a cross rail system and a side rail system is coupled to the tub. A cutting head assembly including a blade and a motor for driving the blade is slidably coupled to the cross rail system facilitating positioning the cutting head assembly relative to the tile received within the tub. The cross rail system in turn is slidably coupled to the side rail system for facilitating movement of the cutting head assembly to cut the tile received within the tub. Additionally, the blade is positioned at a depth that allows full penetration through the tile and into contact with water received within the tub.

BRIEF DESCRIPTION OF THE SEVERAL VIEWS OF THE DRAWINGS

In the accompanying drawings, which form a part of the specification and are to be read in conjunction therewith and in which like reference numerals are employed to indicate like parts in the various views:

FIG. 17 is a cross-sectional view of the tile cutting machine of FIG. 16 taken along the line 17-17;

FIG. 18 is an enlarged view of a portion of the holding mat of FIG. 16 taken in the area of 18;

FIG. 31 is fragmentary right side elevational view of the cutting head assembly of the tile cutting machine of FIG. 23 with portions omitted for clarity and a portion of the housing cut away to reveal a cutting head assembly lock; and FIG. 32 is an enlarged view of the area 32 of FIG. 31.

DETAILED DESCRIPTION

Figure 1:
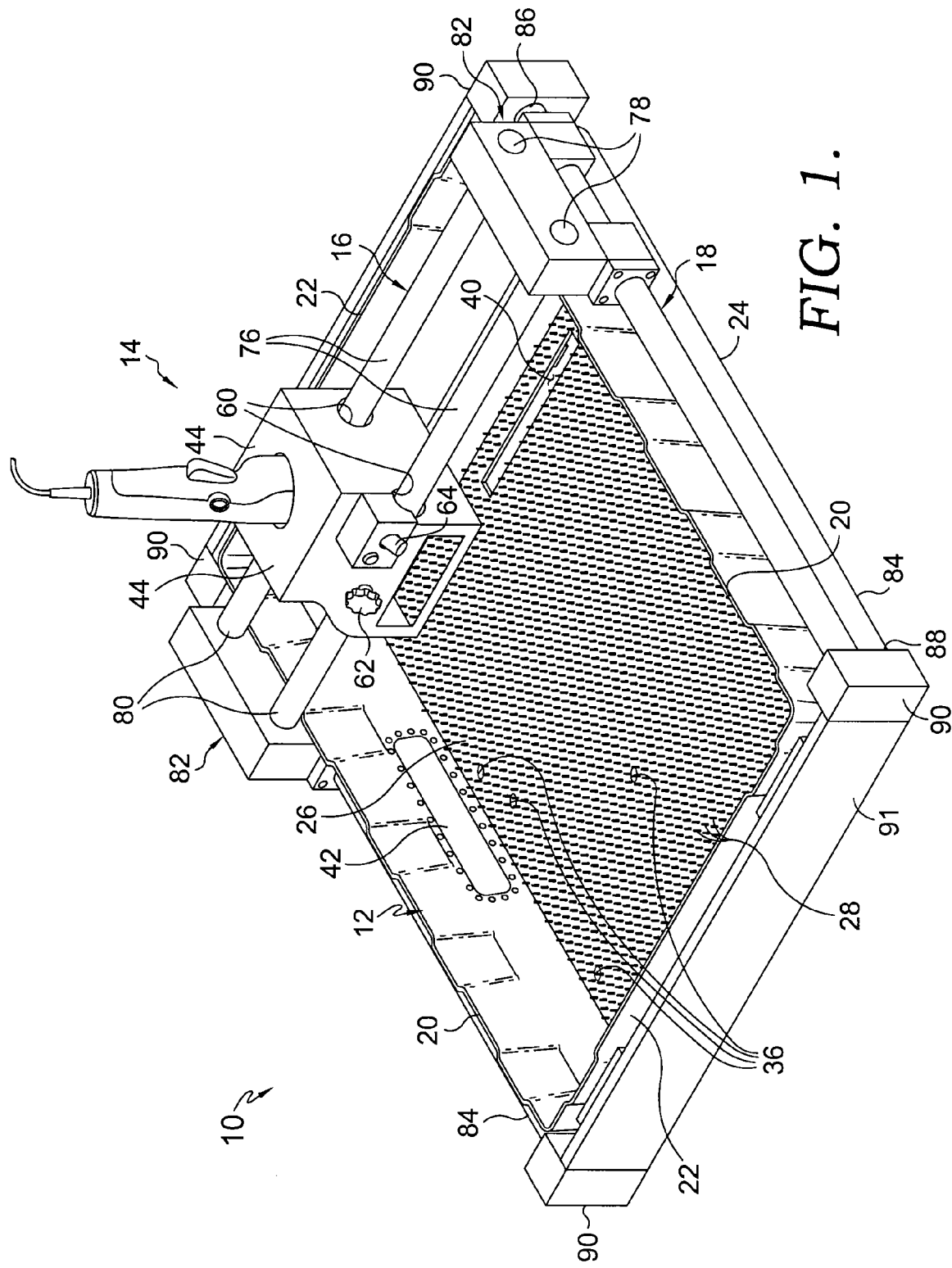
FIG. 1 is a perspective view of a tile cutting machine in accordance with an embodiment of the present invention.

With reference to the drawings, wherein like reference characters designate like parts throughout the different views, a tile cutting machine according to an embodiment of the present invention is designated generally with the reference numeral 10. The tile cutting machine 10 may be used to cut objects, such as tiles, pavers, and bricks, of a variety of different materials, such as, for instance, ceramic, porcelain, stone, marble, slate, travertine, and granite. The term tile, as used herein, is not to be construed in a limiting fashion, but should be interpreted broadly to encompass, in addition to the items mentioned above, any item that would generally be cut by a wet saw. The tile cutting machine 10 generally includes a tub 12 for receiving tiles to be cut, a cutting head assembly 14 for cutting tiles, and cross and side rail systems 16, 18 for facilitating movement of the cutting head assembly 14 relative to the tub 12.

The tub 12 retains water used for tile cutting and generally includes a pair of side walls 20, a pair of end walls 22, and a bottom 24. It should be readily understood that the tub 12 could be any desired shape with any number of walls (e.g., round, octagonal, etc.) and still perform the function of retaining water used during cutting of a tile. A holding mat 26 that includes a plurality of raised nubs 28 extending perpendicularly from the plane of the holding mat 26 is received within the tub 12 and supported by an elevated table 30. The holding mat 26 and nubs 28 are generally constructed from rubber, however, any suitable material that creates a high friction, non-slip relationship with a tile surface when placed in contact therewith may be used. Preferably, the nubs 28 have a hardness and stiffness sufficient to support a tile 31 placed on the holding mat 26, but are flexible enough such that the nubs 28 may be pushed out of the way if contacted by a cutting blade while a tile is cut. The nubs 28 provide frictional gripping on the bottom of a tile placed on the holding mat 26, thereby facilitating cutting of the tile without requiring a user to press down on the tile with a hand. The nubs 28 also permit water to reside there between and directly under the majority of a bottom surface of the tile during the cutting operation. By elevating the table 30 and holding mat 26, debris may drop off the holding mat 26 and into the bottom of the tub 12. Further, sediment can settle underneath the mat and be out of sight while also not interfering with the ability of the mat to hold tiles. It should be noted that while some benefits (e.g., cleaning, replacement, etc.) have been found in having a separate holding mat 26 that is removable from the tub 12, it is within the scope of the present invention to have a tub that has nubs 28 formed in or molded in the bottom 24, thereby eliminating the need for a separate holding mat 26.

Figure 2:
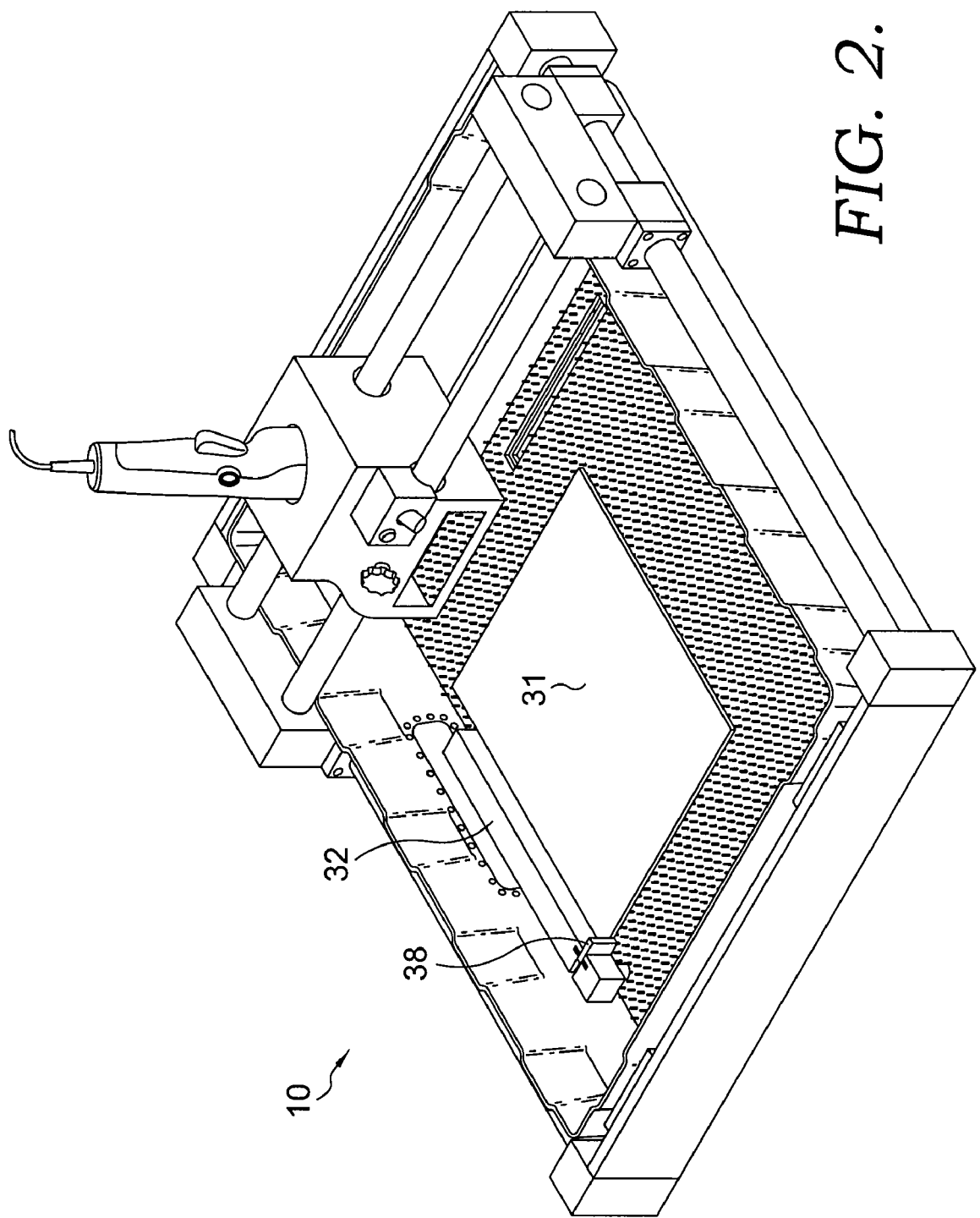
FIG. 2 is a perspective view of the tile cutting machine of FIG. 1, but showing a fence and a tile received within a tub of the tile cutting machine.
Figure 3:
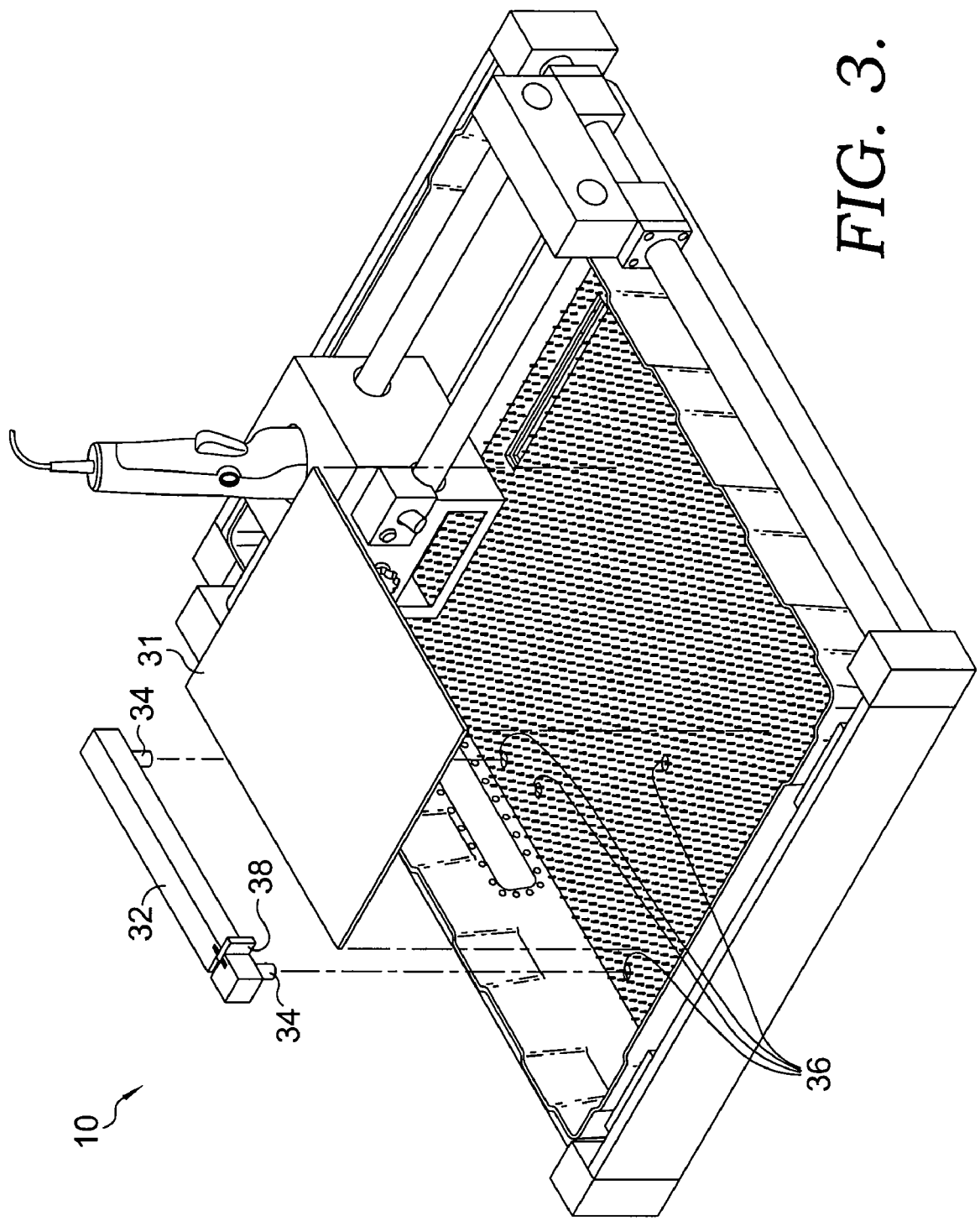
FIG. 3 is an exploded perspective view of the tile cutting machine of FIG. 2.
Figure 4:
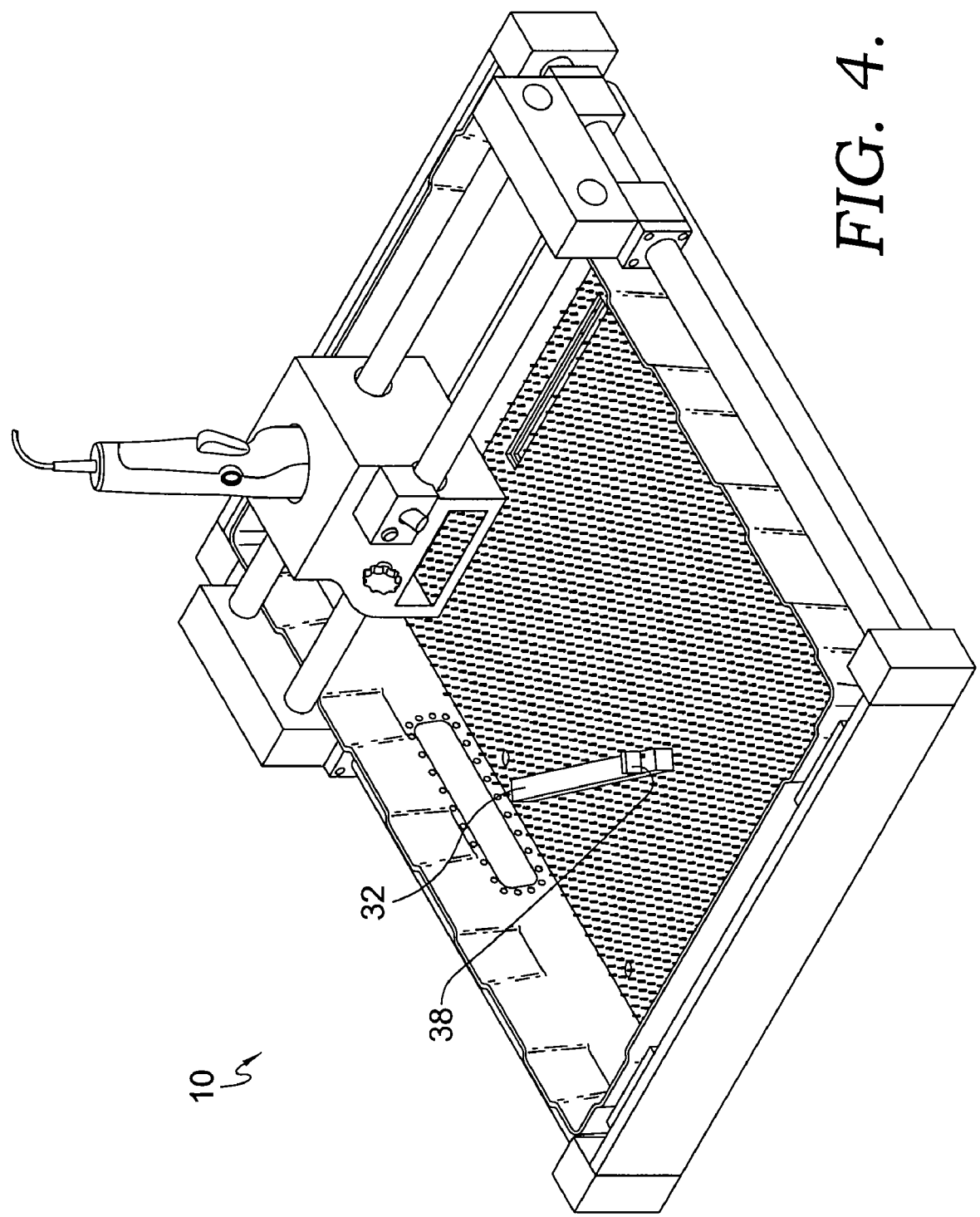
FIG. 4 is a perspective view of the tile cutting machine of FIG. 1, but showing a fence received within the tub of the tile cutting machine at a location facilitating a 45-degree angle cut.

A fence 32 may be placed in the tub 12 to facilitate aligning tiles to be cut. The fence 32 includes lower projections 34 that may be received in holes 36 in the holding mat 26 (and/or table 30). In various embodiments, a number of holes 36 may be provided at various locations in the holding mat 26 such that the fence 32 may be positional in the tub 12 to allow tiles to be cut at various angles to the left or right of a center line. For instance, as shown in FIG. 2, the fence 32 is positioned to allow a tile to be cut at a 90-degree angle. Alternatively, as shown in FIG. 4, the fence 32 may be positioned to allow a tile to be cut at a 45-degree angle. It should be understood that any of a variety of additional positions for the fence 32 may be provided within various embodiments of the present invention. Additionally, it should be understood that corresponding holes 36 may be placed in the mat 26 on the opposite side of the tub 12 (in this case, as illustrated, on the right side of the mat 26) such that the setup becomes ambidextrous to accommodate both left and right handed users of the tile cutting machine 10. This arrangement allows a user to operate the cutting head assembly 14 with either their left or right hand and still maintain maximum visibility of the tile.

Figure 5:
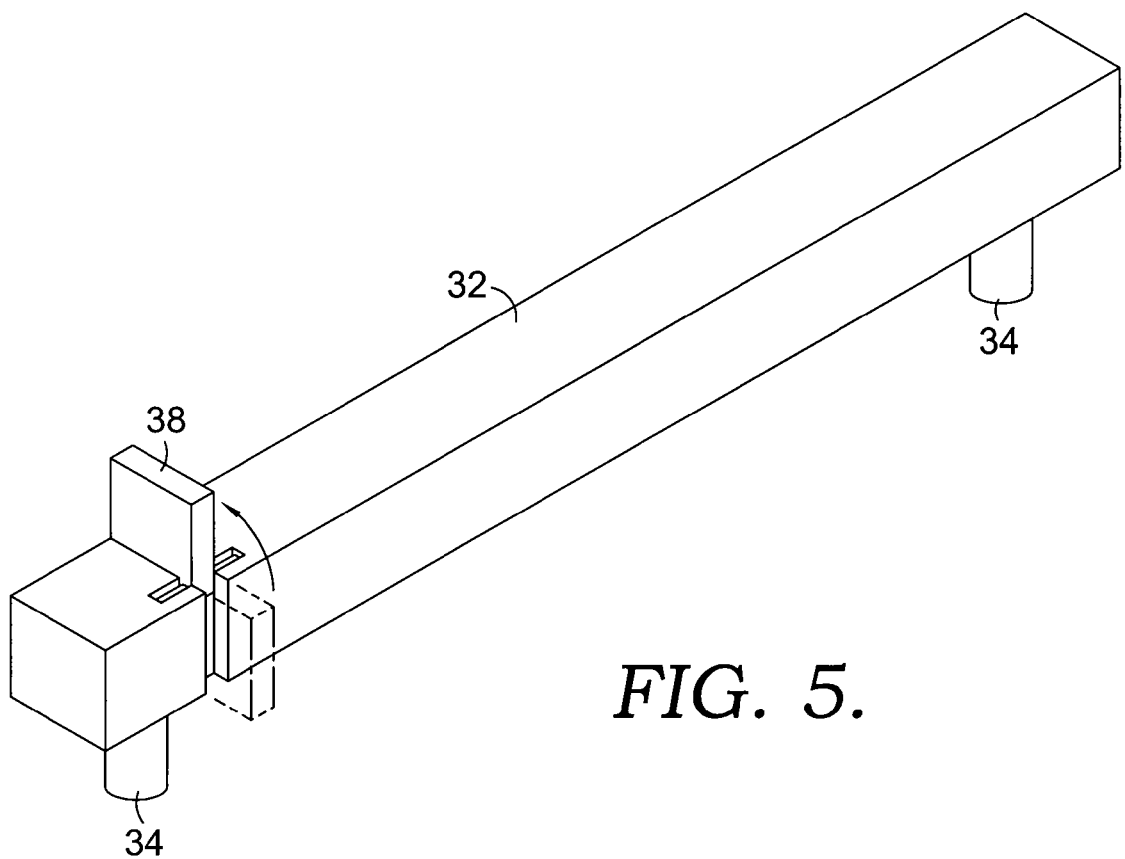
FIG. 5 is a perspective view of a fence in accordance with an embodiment of the present invention.
Figure 6:
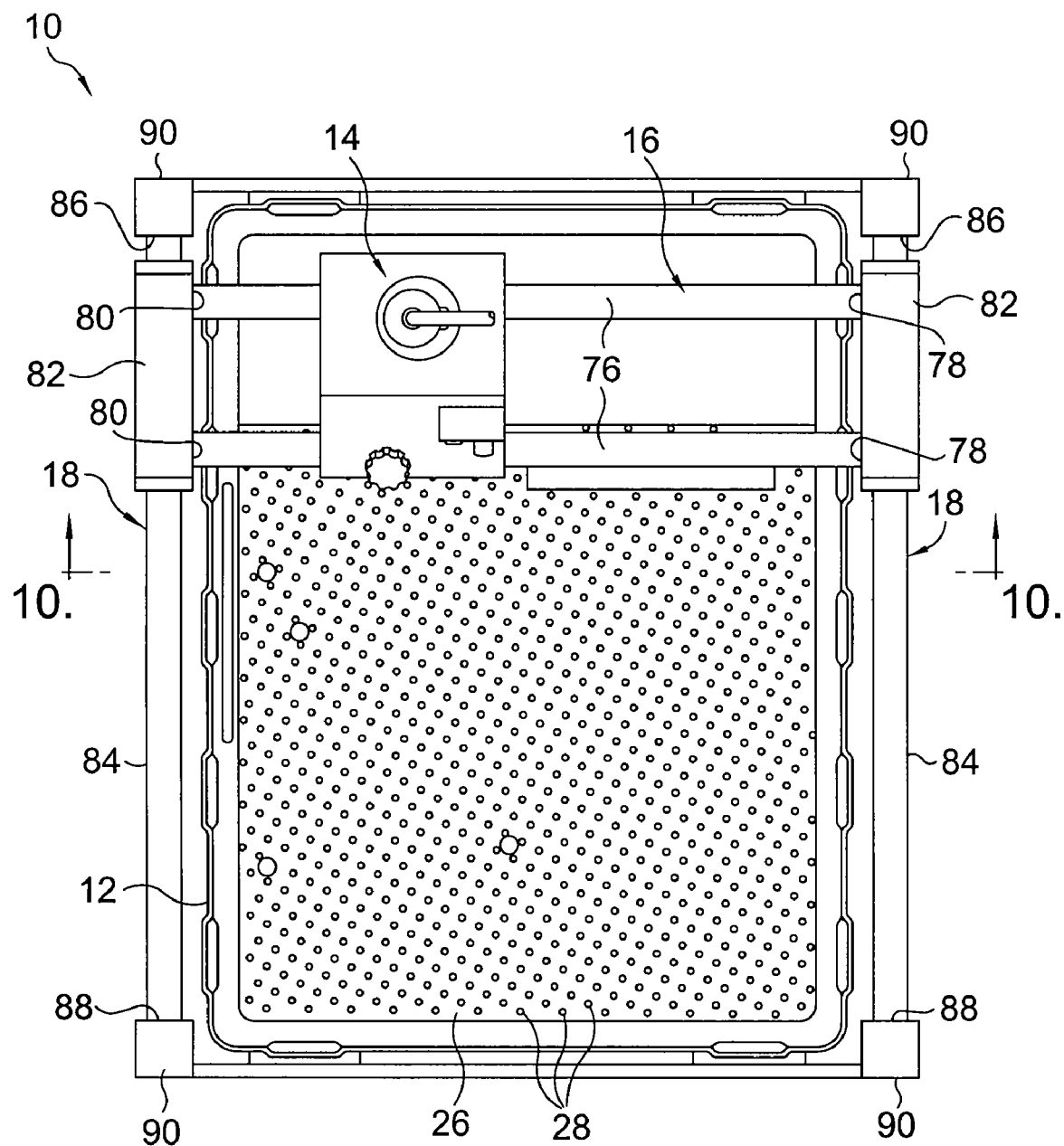
FIG. 6 is a top view of the tile cutting machine of FIG. 1.
Figure 7:
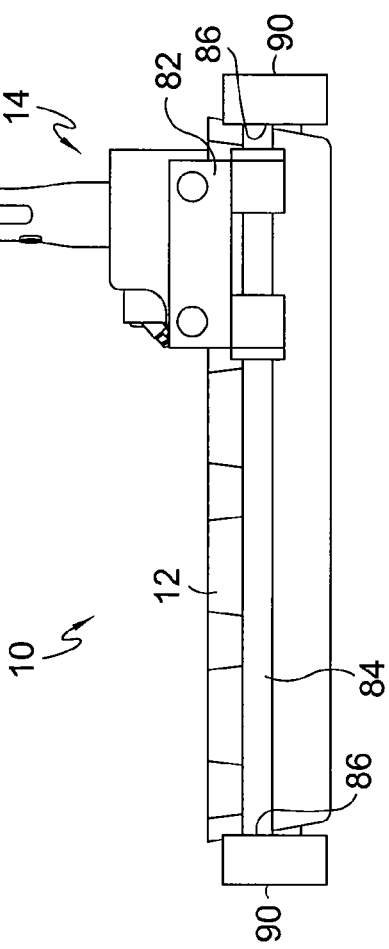
FIG. 7 is a left side elevational view of the tile cutting machine of FIG. 1.
Figure 8:
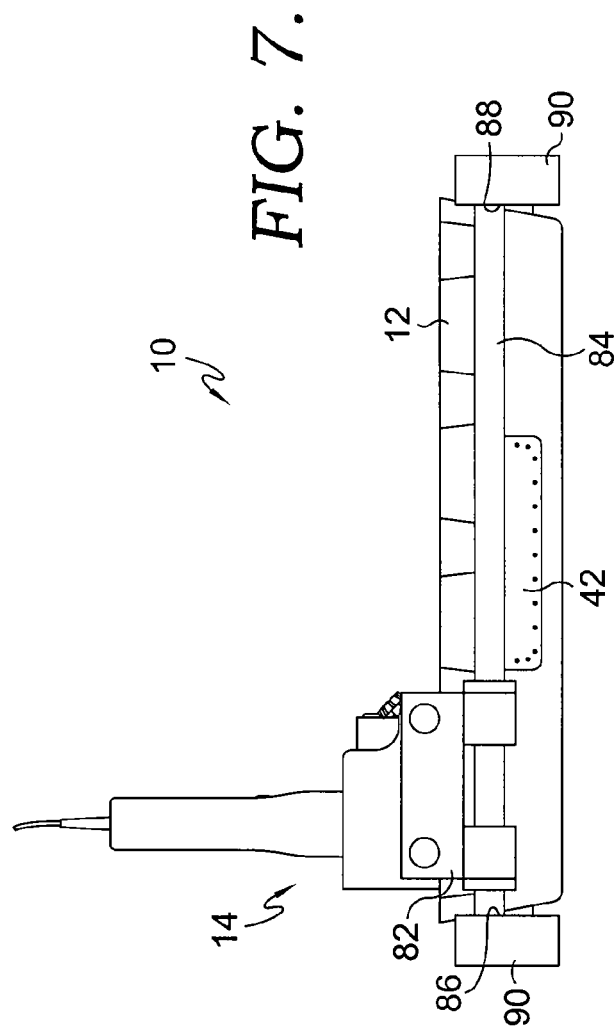
FIG. 8 is a right side elevational view of the tile cutting machine of FIG. 1.
Figure 9:
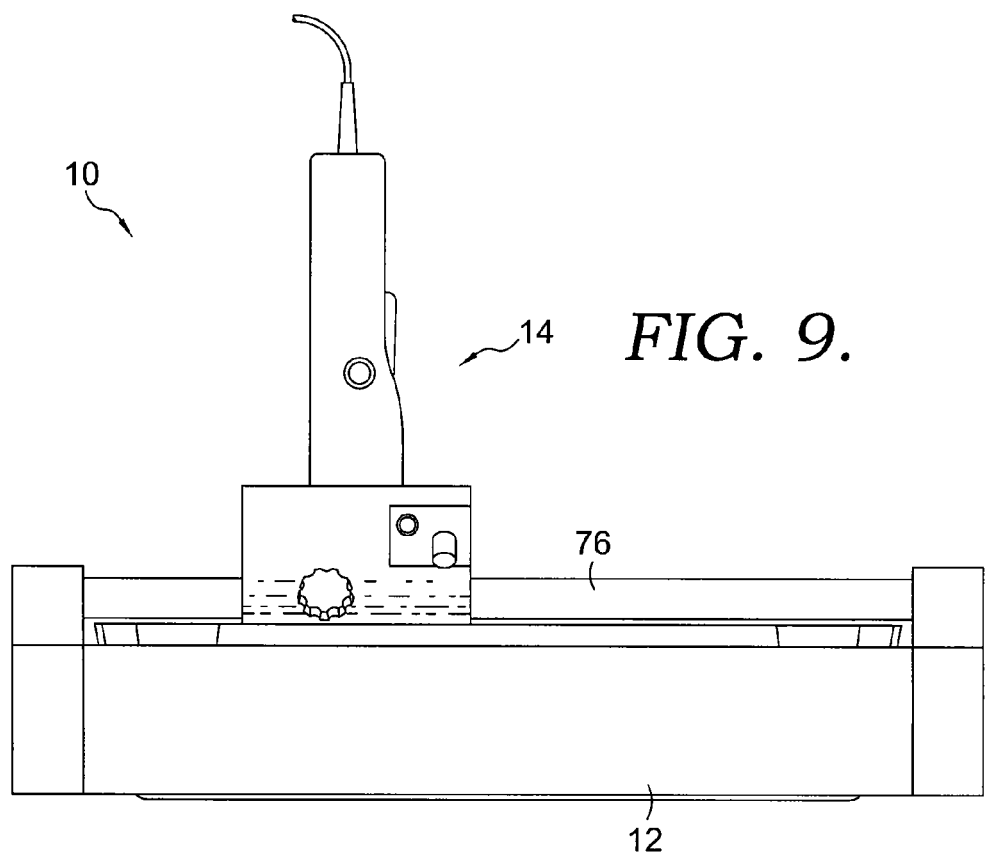
FIG. 9 is a front elevational view of the tile cutting machine of FIG. 1.
Figure 10:
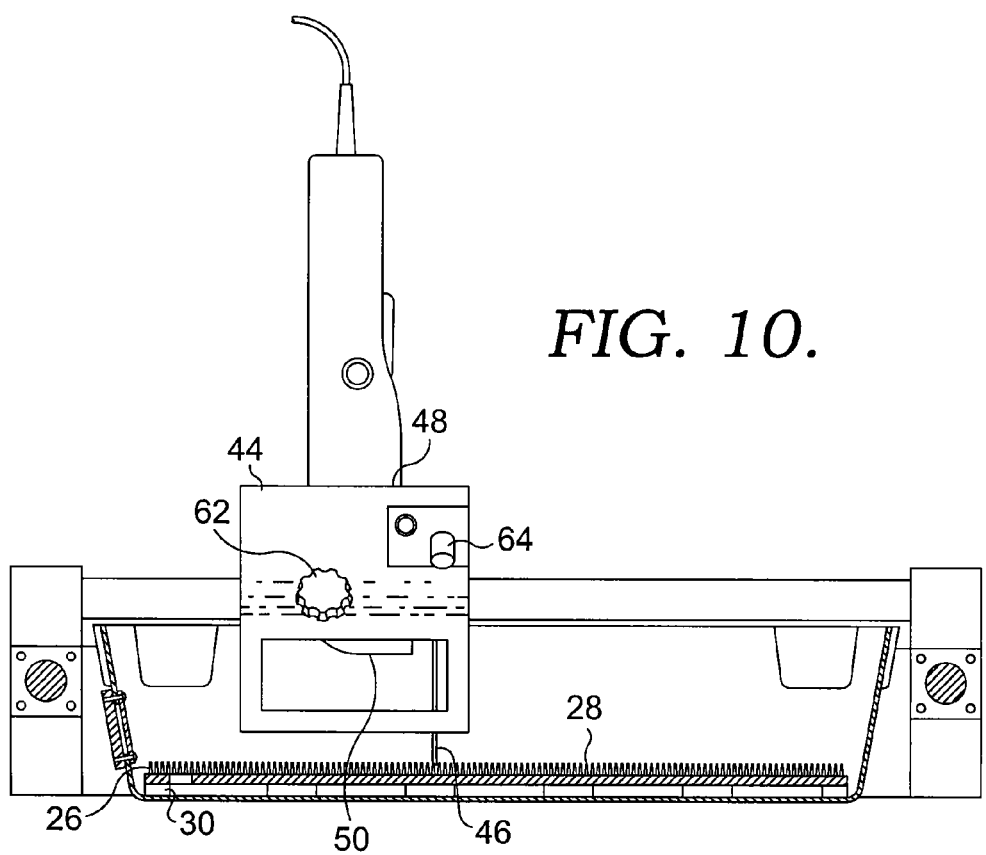
FIG. 10 is a sectional view of the tile cutting machine of FIG. 9.

In an embodiment, the fence 32 may be provided with an arm 38 that is hingedly attached near one end of the fence 32, allowing the arm 38 to be moved between a down position and an up position. As shown in FIG. 5, the arm 38 extends perpendicular to the length of the fence 32 and, in the down position, lies across the surface of the holding mat 26. When the arm 38 is placed in the down position, a tile 31 may be placed with one side abutting the fence 32 and an adjacent side abutting the arm 38. In this manner, the arm 38 acts as a stop to provide resistance for the tile as the tile is cut, as well as facilitate alignment of the tile. In the up position, the arm 38 does not extend past the side of the fence 32 but instead extends away from the surface of the holding mat 26 such that a continuous surface is provided by the fence 32 for aligning a tile. It may be desirable to place the arm 38 in the up position, for instance, when insufficient space would be available in the tub 12 for cutting larger tiles with the arm 38 in the down position. Additionally, the arm 38 may be coupled with the fence 32 such that it may be moved to a down position on either side of the fence 32 to accommodate use of the fence 32 on either side of the tub (i.e., to allow the fence 32 to be used with both left and right handed setups).

In various embodiments of the present invention, the tile cutting machine 10 may be configured to facilitate cutting specialty tile pieces. For instance, in one embodiment, a slot 40 may be provided in the holding mat 26 and table 30 for receiving a portion of corner tiles. To cut a corner tile, one side piece of the corner tile may be placed in the slot 40 such that the other side piece lies flat on the holding mat 26 and may be cut using the cutting head assembly 14. After it has been cut, the other side piece may be placed in the slot 40 such that the one side lies flat on the holding mat 26 and may be cut.

To facilitate cutting oversized pieces, a door 42 may be provided on one side wall 20 of the tub 12 that may be removed to provide an opening in the tub 12. Part of an oversized tile piece may be inserted through the opening, and the end of the oversized tile piece within the tub 12 may then be cut using the cutting head assembly 14. It should be readily understood that the tub could be provided with multiple doors positioned at various locations around the tub (e.g., at every 90° or 45°) to accommodate longer items and/or provide for an ambidextrous setup.

Figure 16:
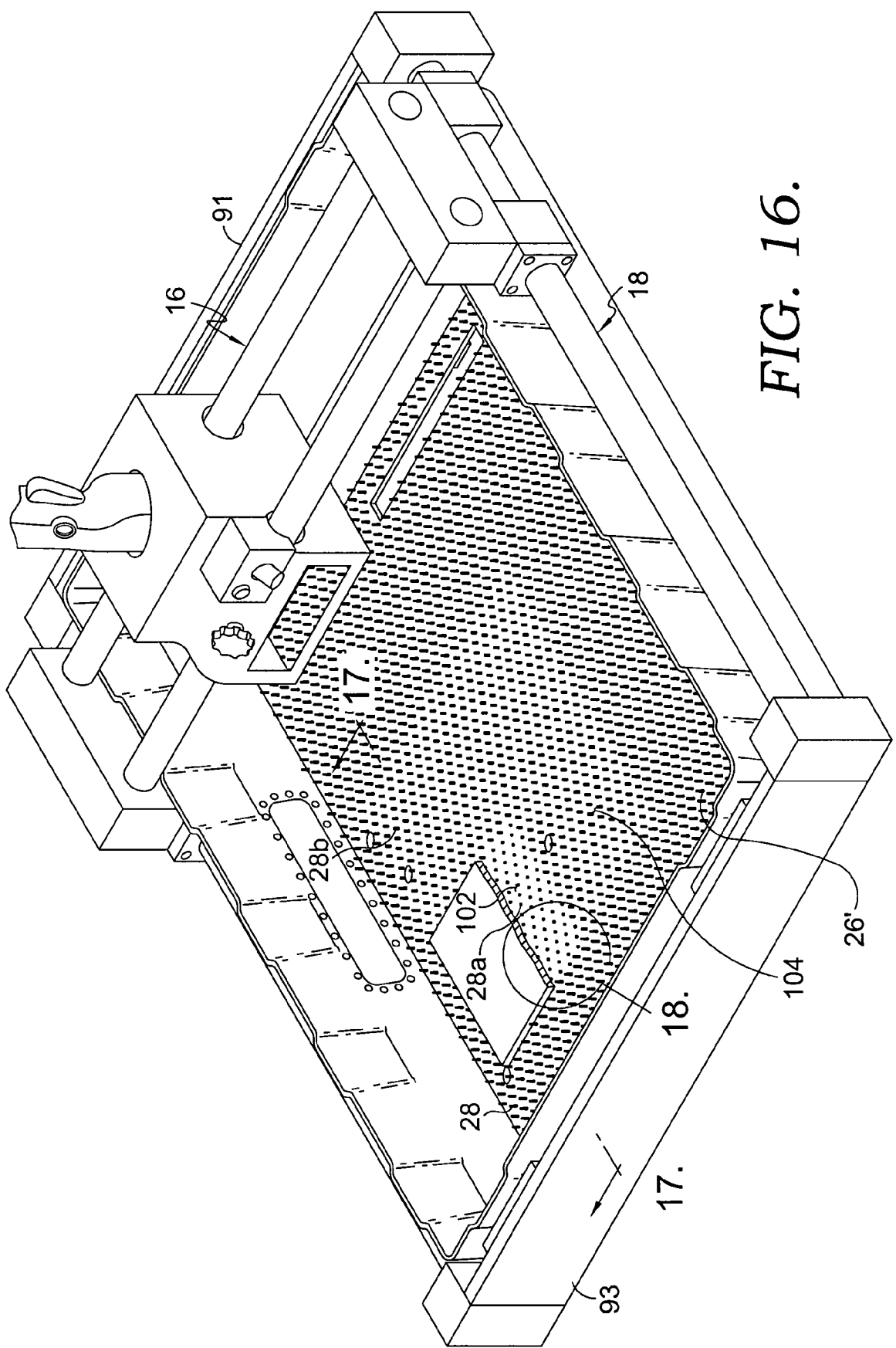
FIG. 16 is a perspective view of the tile cutting machine of FIG. 1, but showing an alternate embodiment of a holding mat with a tile placed thereon for cutting.

In some embodiments, such as those illustrated in FIGS. 16-18, specialty tile recesses may be formed in the holding mat 26 to receive small specialty tile pieces having increased thickness or a tile of a standard size. The recesses may be specifically sized such that the standard size tiles or the specialty tile pieces fit within the recesses. For example, FIG. 16 illustrates an embodiment of a holding mat 26' having a first recessed area 102 where the nubs 28a are about half their normal height in an area that is, for example, four inches wide by four inches long. As a result, a standard 4"×4" tile will fit in the first recessed area 102 and be self aligned. Additionally, the taller nubs 28 outside the first recessed area 102 act on the side of the 4"×4" tile during the cutting procedure to assist with holding it in place as it is cut.

The holding mat 26' also includes a second recessed area 104 where the nubs 28b are about three quarters their normal height in an area that is, for example, eight inches wide by eight inches long. As a result, a standard 8"×8" tile will fit in the second recessed area 104. FIGS. 17 and 18 further illustrate the nubs of varying height. Accordingly, the recesses allow for an increased thickness of a specialty tile piece as well as facilitate aligning and holding a standard size tile piece in place while cutting. The holding mat 26 is removable to permit ready use of mats of different nub patterns or heights, as well as to permit easy replacement of worn or damaged mats.

Movable relative to the tub 12 is a cutting head assembly 14, which provides for tile cutting. The cutting head assembly 14 generally includes a casing 44 housing a blade 46 and a motor 48 for driving the blade 46 through a drive system 50. A blade LED (not shown) may also be provided within the casing 44. The LED shines on the blade to allow illumination of areas which are blocked from light, thereby providing better vision of the cutting area. While an LED has been identified for providing illumination, any light source capable of illuminating the cutting area and/or under the casing 44 will suffice.

Figure 11:
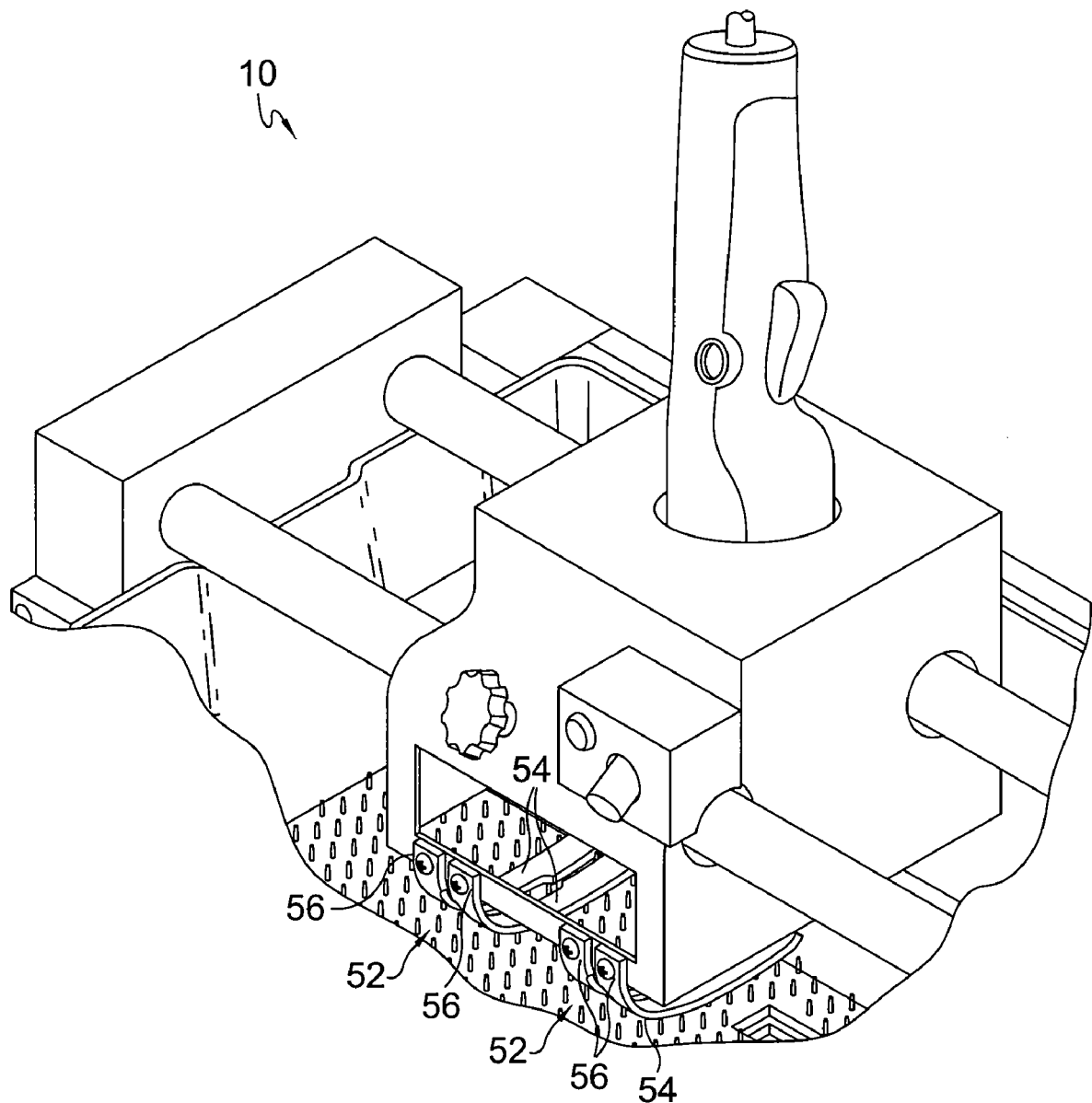
FIG. 11 is a perspective view of a cutting head assembly with hold-down feet in accordance with an embodiment of the present invention.

In an embodiment such as that shown in FIG. 11, the cutting head assembly 14 is provided with flexible hold-down feet 52 to assist with maintaining a tile in position while the tile is being cut. The hold-down feet 52 comprise elongated members 54 that are coupled at a first end 56 to the front end of the casing 44. Any suitable attachment method may be used for coupling the hold-down feet 52 to the casing 44, such as bolts, pins, rivets, and the like. The hold-down feet 52 are biased in a manner such that as the cutting head assembly 14 is moved along the length of the tub 12 to cut a tile, the hold-down feet 52 engage the top of the tile and press it downwardly. In this manner, the hold-down feet 52 work in conjunction with the nubs 28 gripping the bottom of the tile to maintain the tile in place. As such, a tile may be cut without requiring a user to press down on the tile with one hand.

In addition to the hold-down feet 52, or in place thereof, rollers (not shown) may be positioned on the casing 44 for holding down a tile during the cutting operation. The rollers may be biased downwardly away from the casing 44. During the cutting operation, the rollers would be deflected upwardly when they come into contact with a tile. This arrangement accommodates tiles of varying thickness. This arrangement also provides for the deflected roller to exert a downward pressure on the tile during the cutting operation.

Figure 12:
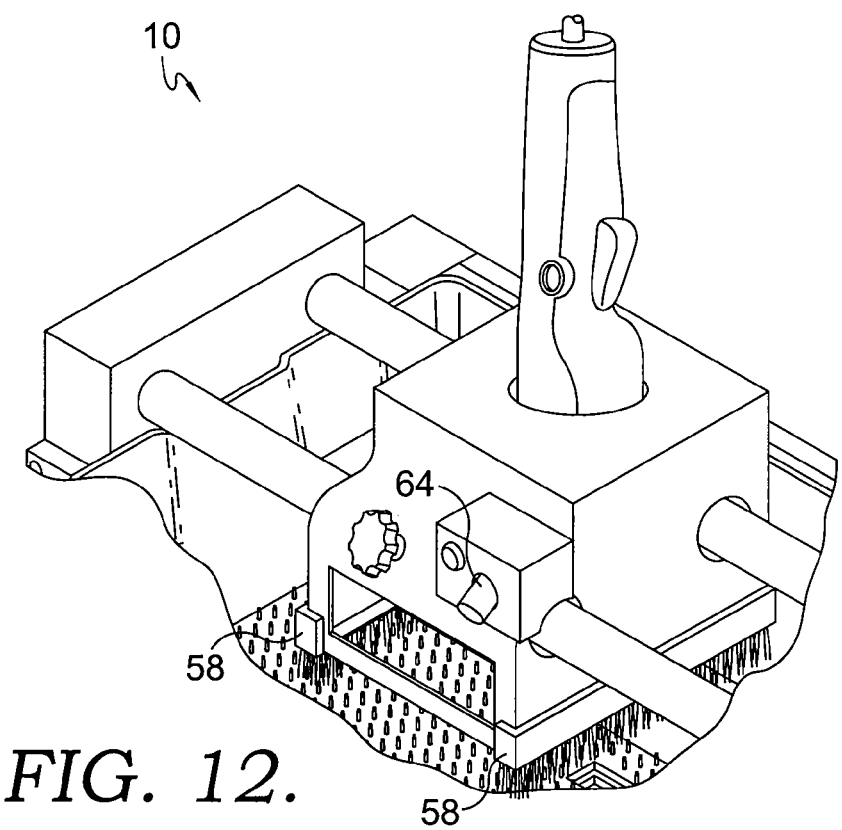
FIG. 12 is a perspective view of a cutting head assembly with bristle skirts in accordance with an embodiment of the present invention.

In another embodiment, such as that shown in FIG. 12, bristle skirts 58 are disposed on the cutting head assembly 14 to facilitate maintaining the tile in position while the tile is being cut. The bristle skirt 58 may be coupled to the casing 44 on either side of the blade 46. Similar to the hold-down feet 52, the bristle skirts 58 engage the top of a tile to be cut and work in conjunction with the nubs 28 gripping the bottom of the tile to maintain the tile in place as the tile is cut. By varying the number, stiffness and density of the bristles, the downward force provided by the bristle skirts when they are deflected can be altered. In some embodiments, the bristles may be very stiff and closely packed to provide a significant downward force on the upper surface of the tile when the bristles are deflected. In addition to being biased back to a straight position, the deflected bristles can act like a feather board to resist a kick back or rearward movement of the cutting head assembly 14 during the cutting operation. Additionally, the bristle skirts 58 reduce water splash and spray as the tile is being cut, thereby helping to retain water in the tub 12. Although the bristle skirts are shown in FIG. 12 as being disposed on the casing 44 on either side of the blade 46, one skilled in the art will recognize that bristle skirts may additionally or alternatively be placed on the casing 44 in front of and/or behind the blade 46. Such an enclosure of the cutting area with bristle skirts 58 also acts to contain the dust that results from the cutting process.

The cutting head assembly 14 is movable relative to the tub 12 via a rail system that includes a cross rail system 16 and a side rail system 18. The cross rail system 16 includes a pair of cross rails 76 that facilitate lateral movement of the cutting head assembly 14 relative to the tub 12 to facilitate positioning of the cutting head assembly 14 for cutting tiles. In the illustrated embodiment, the use of two cross rails 76 is shown as this provides increased stability for the cutting head assembly. Nonetheless, although two cross rails 76 are shown in the drawings, it should be understood that one or more cross rails 76 may be employed in various embodiments of the present invention.

The casing 44 of the cutting head assembly 14 includes rail openings 60, allowing the passage of the cross rails 76 through the casing 44. Cross rail bearing housings (not shown) are disposed within and secured to the casing 44. The cross rail bearing housings include rail bearings that slidably engage the cross rails 76 to facilitate movement of the cutting head assembly 14 along the cross rails 76.

Figure 13:
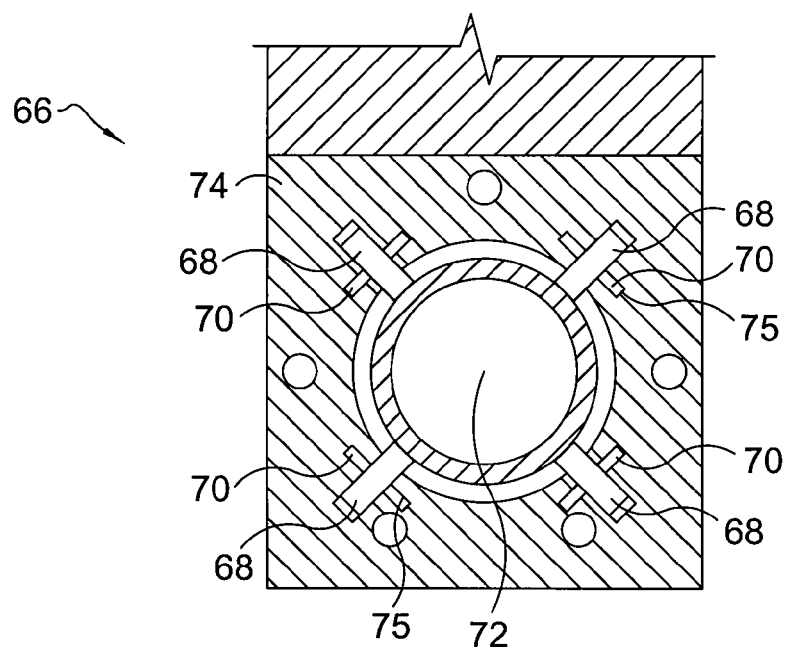
FIG. 13 is a fragmentary cross-sectional side elevational view of a rail bearing in accordance with an embodiment of the present invention.

A rail bearing 66 in accordance with one embodiment of the present invention is illustrated in FIG. 13. However, it should be understood that other types of rail bearings may be used within the scope of embodiments of the present invention. As shown in FIG. 13, four wheels or roller bearings 68 secured on axle pins 70 are disposed at 90-degree intervals about a rail opening 72 formed in a bearing housing 74. Slots 75 are formed in the bearing housing 74 and receive the axle pins 70. The roller bearings 68 may be constructed of plastic or other suitable material, while the pins 70 may be constructed of metal or other suitable material.

A cutting head assembly lock 62 is provided for locking the cutting head assembly 14 in position along the cross rails 76. Additionally, a laser 64 is provided on the cutting head assembly 14 for aligning the cutting head assembly 14 for cutting tiles. The laser 64 projects a bright line 65 down into the tub 12 and onto the upper surface of the mat 26. The projected line is in alignment with the plane of the blade 46, thereby showing the location of the cutting path or a cut to be performed on a tile. Further, a scale or measuring device (not shown) may be provided on the end wall 22 of the tub. The scale may be intersected by the line projected by the laser to allow for accurate measuring of the cutting width on a tile without having to measure the tile directly with a separate measuring device or mark directly on the tile.

Each of the cross rails 76 include first and second distal ends 78, 80 that are coupled to side rail bearing housings 82 of the side rail system 18. Any suitable attachment method may be used for coupling the first and second ends 78, 80 of the cross rails 76 to the side rail bearing housings 82, such as bolts, pins, rivets, and the like. The side rail system 18 includes a pair of side rails 84 that extend along the sides of the tub 12 and terminate at first and second distal ends 86, 88, which are secured to end blocks 90. The end blocks 90 represent the four corner posts of a base 91 that supports the rail systems 16, 18. The base 91 preferably includes the four end blocks 90 connected together by the side rails 84 and front and back cross rails 93. The tub 12 is preferably sized to fit within the base 91 and is removable therefrom for ease in emptying and carrying. The side rails 84 allow front to back movement of the cross rail system 16 and cutting head assembly 14 along the length of the tub 12 to facilitate cutting tiles placed within the tub 12. While rail systems 16, 18 have been disclosed as being separate from the tub and supported on the end blocks 90, it should be noted that it is within the scope of the present invention for the base 91 to be connected to the tub 12 (as in FIGS. 19-22). Similarly, it is within the scope of the present invention to eliminate the need for the corner posts 90 and the base 91 by mounting the side rail system 18 directly to sidewalls of the tub 12 (also as in FIGS. 19-22). Further still, it is within the scope of the present invention to, in an economy versions of the present invention, to completely eliminate the side rails and simply have the cross rail system 16 slide along the upper edge of the opposite sidewalls. In this arrangement, the right and left sidewalls would form tracts along which the cross rail system 16 would move.

The side rail bearing housings 82 include rail bearings for slidably engaging the side rails 84 and facilitating movement of the cross rail system 16 and the cutting head assembly 14 along the side rails 84. In one embodiment, rail bearings 66, such as that shown in FIG. 13 and discussed above, are employed. However, it should be understood that other types of rail bearings may be used within the scope of embodiments of the present invention.

Figure 14:
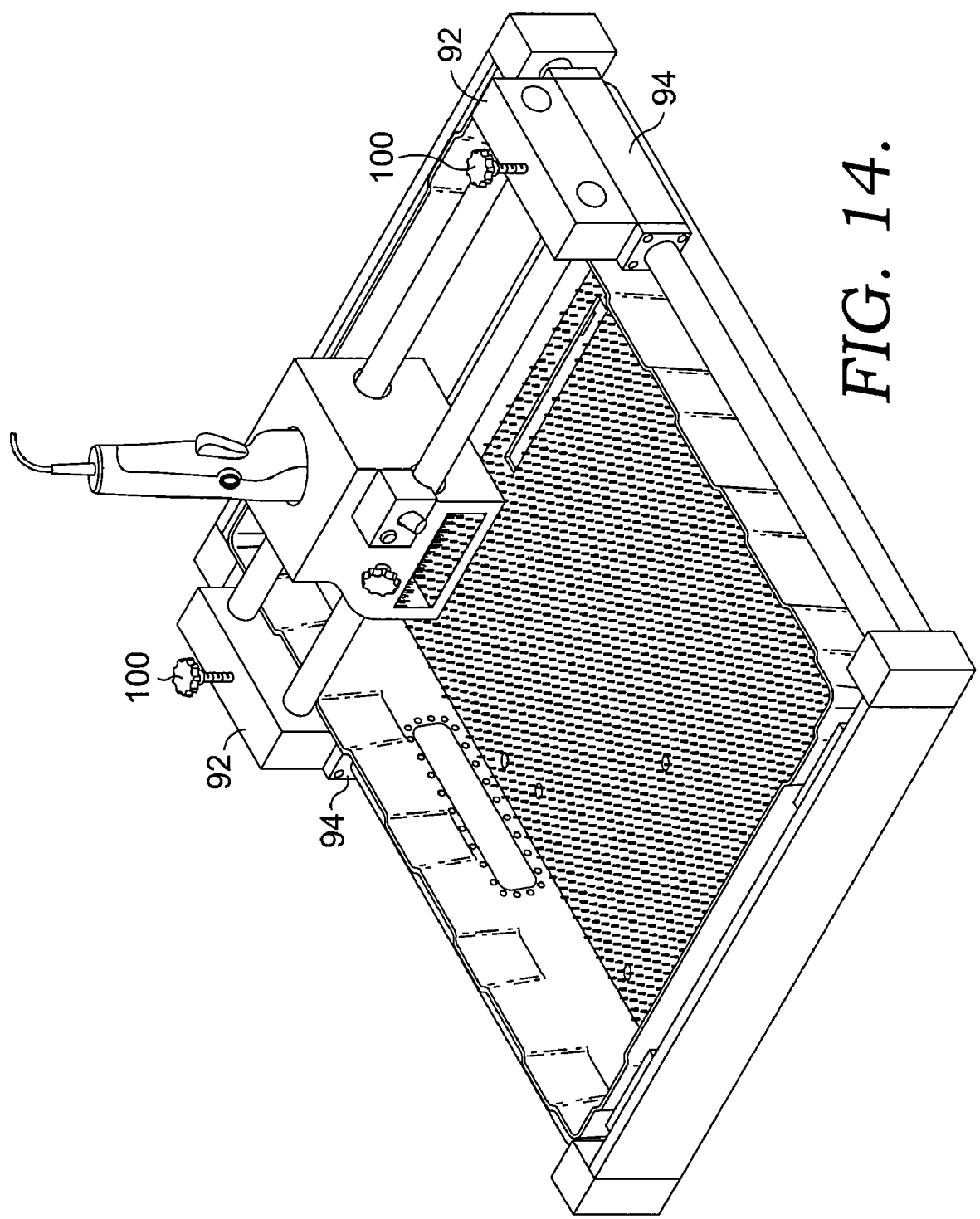
FIG. 14 is a perspective view of a tile cutting machine with a removable cross rail system in accordance with another embodiment of the present invention.
Figure 15:
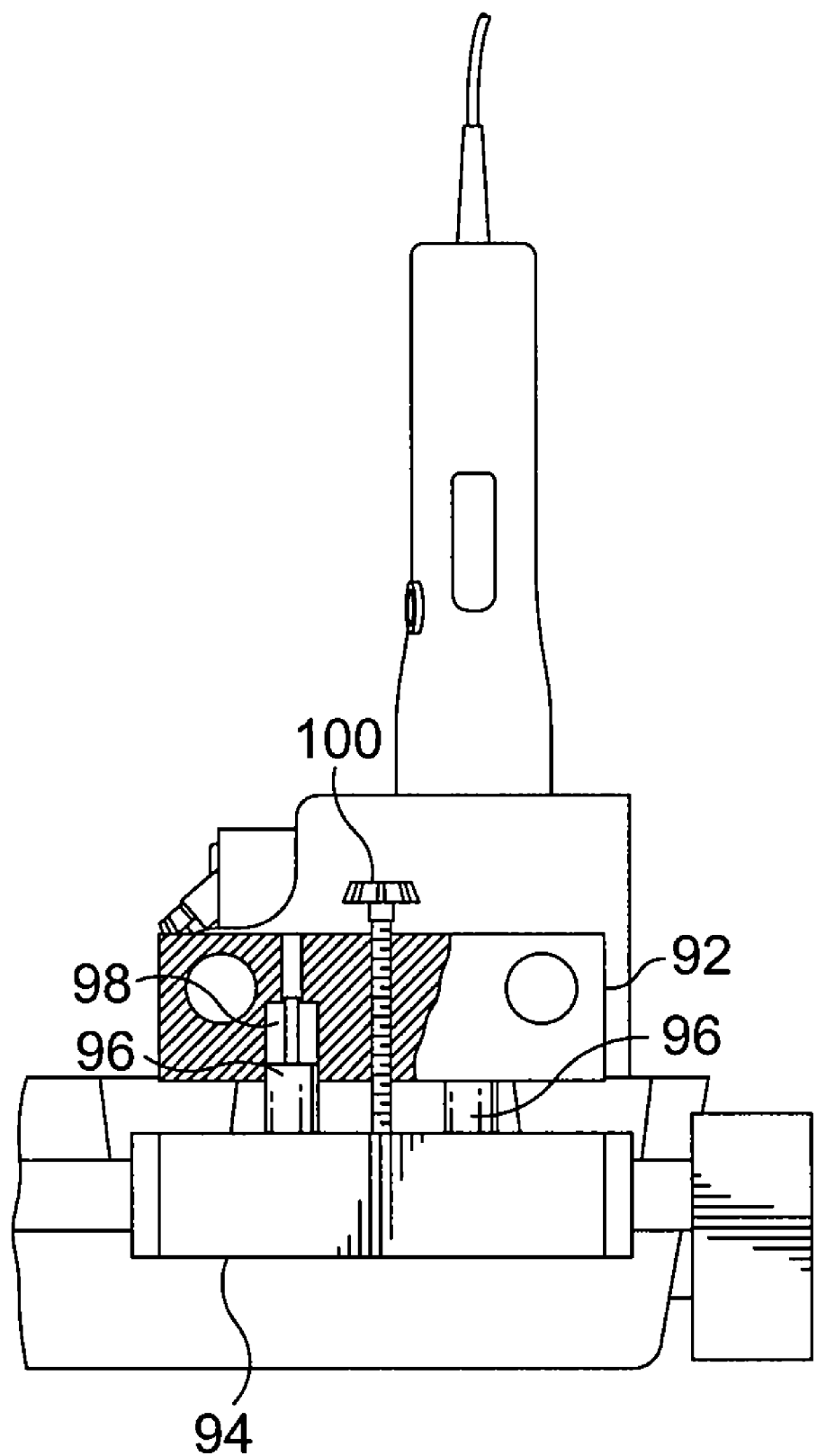
FIG. 15 is a fragmentary sectional view of a side rail bearing housing of the tile cutting machine of FIG. 14.

In some embodiments, such as that shown in FIGS. 14 and 15, the side rail bearing housings 82 may include separate upper and lower side rail bearing housings 92, 94. As such, the upper side rail bearing housing 92 may be removed from the lower side rail bearing housing 94 to facilitate removal of the cutting head assembly 14 and allow easier storage, cleaning, maintenance, and blade changing, for instance. Additionally, separate upper and lower side rail bearing housings 92, 94 may allow for adjustment of the height of the cutting head assembly 14. For instance, as shown in FIG. 15, in one embodiment, the lower side rail bearing housing 94 includes pegs 96 that may be received within openings 98 in the upper side rail bearing housing 92. Additionally, a height adjustment screw 100 is provided in the upper side rail bearing housing 92. As a user turns the height adjustment screw 100, the upper side rail bearing housing 92 moves up or down along the height adjustment screw 100 and is guided by the pegs 96. While a default cutting depth where the lowermost portion of the blade 46 during operation is slightly below a plane that includes the upper most tip of the nubs 28, such that the blade would just cut all the way through a tile placed on top of the nubs 28 of the mat 26 and still come into contact with the water, providing a height adjustment feature permits the user to accommodate for blades of varying diameter (though wear or initial size difference), wear in the mat 26 (as nubs are worn down), tiles set in various recessed areas (e.g., 102, 104), and cuts that are not intended to severe the tile into two pieces (e.g., dado and rabbit cuts).

While FIGS. 14 and 15 show an embodiment where height adjustment is provided by moving the cross rail system 16 vertically toward and away from the side rail system 18, it is within the scope of the present invention for the vertical relationship between the rail systems 16, 18 to be fixed and the height adjustment feature be provided in casing 44. In this embodiment, the motor, and in turn the cutting blade 46 is moved up and down inside the casing 44 by way of a height adjustment mechanism. Similarly, the height adjustment screw 100 becomes a locking mechanism similar to the cutting head assembly lock 62 for locking the cross rail system 16 in position along the side rail system. This is accomplished by providing a bore through the lower side rail bearing housing 94 such that the tip of the height adjustment screw 100 can come in contact with the side rail 84. By providing the bore through the lower side rail bearing housing 94 with threads, the upper and lower side rail bearing housings 92, 94 may be secured together.

In addition to providing the height adjustment mechanism in cooperation with the casing 44 of the cutting head assembly 14, the present invention also contemplates an embodiment where the cutting head assembly 14 includes a casing 44 that selectively and releasably holds a stand alone cutting tool (e.g., an angle grinder) therein. In this embodiment, the stand alone cutting tool replaces the motor 48 and the cutting blade 46 as it provides its own self contained motor and cutting blade. When the user desires to use the stand alone cutting tool separately from the tile cutting machine 10, such as to grind a tile already in place, the user simply uncouples the cutting tool from the casing 44 and removes it from the same. Once the user is done, the user positions the stand alone cutting tool back into the casing 44 and securely couples it back with the casing for use as part of the tile cutting machine 10. The height adjustment mechanism in the casing 44 permits the user to use a number of different stand alone tools in connection with the casing 44 and simply adjust the cutting height of each tool to the desired cutting depth.

Figure 19:
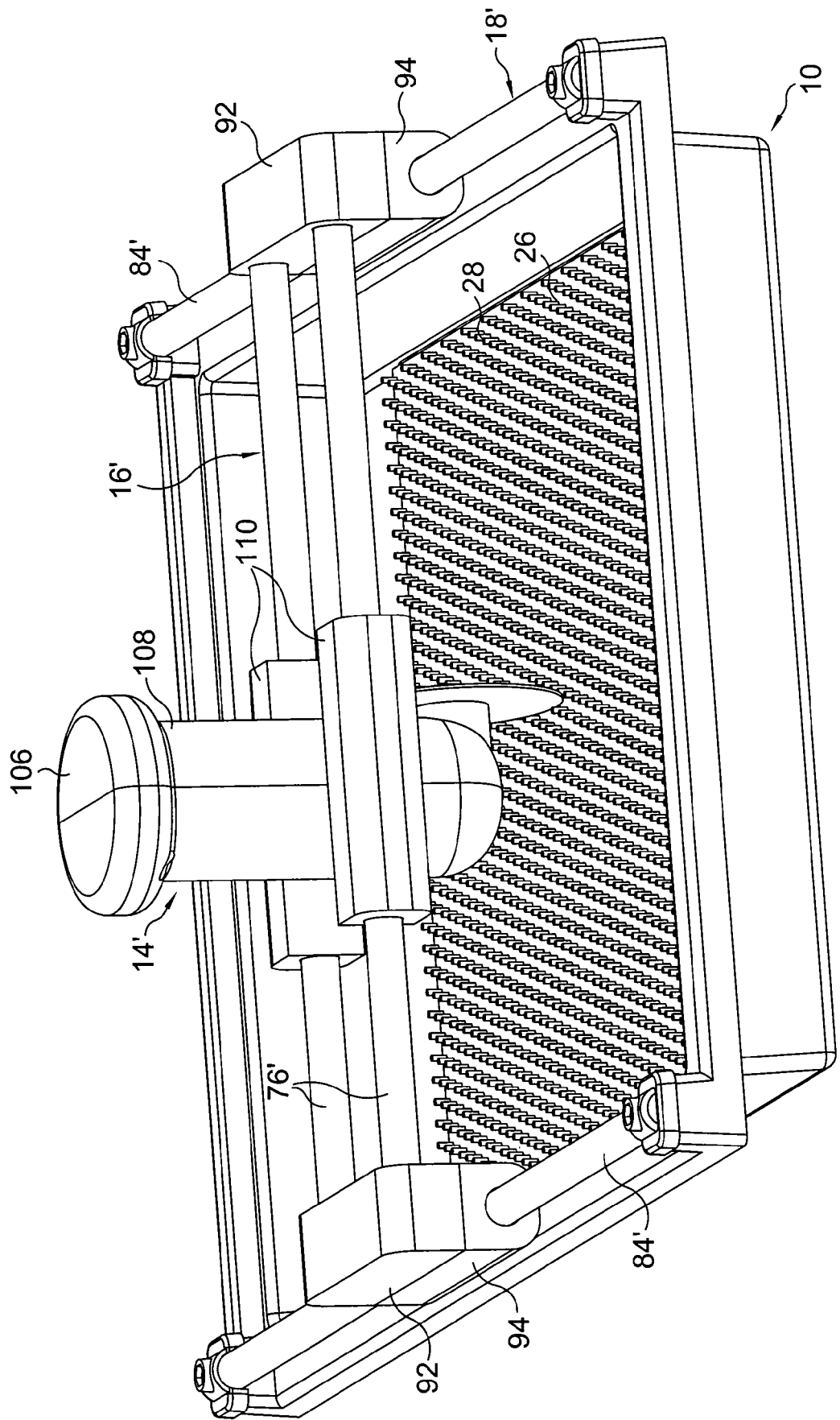
FIG. 19 is a perspective view of a tile cutting machine in accordance with a second embodiment of the present invention.
Figure 20:
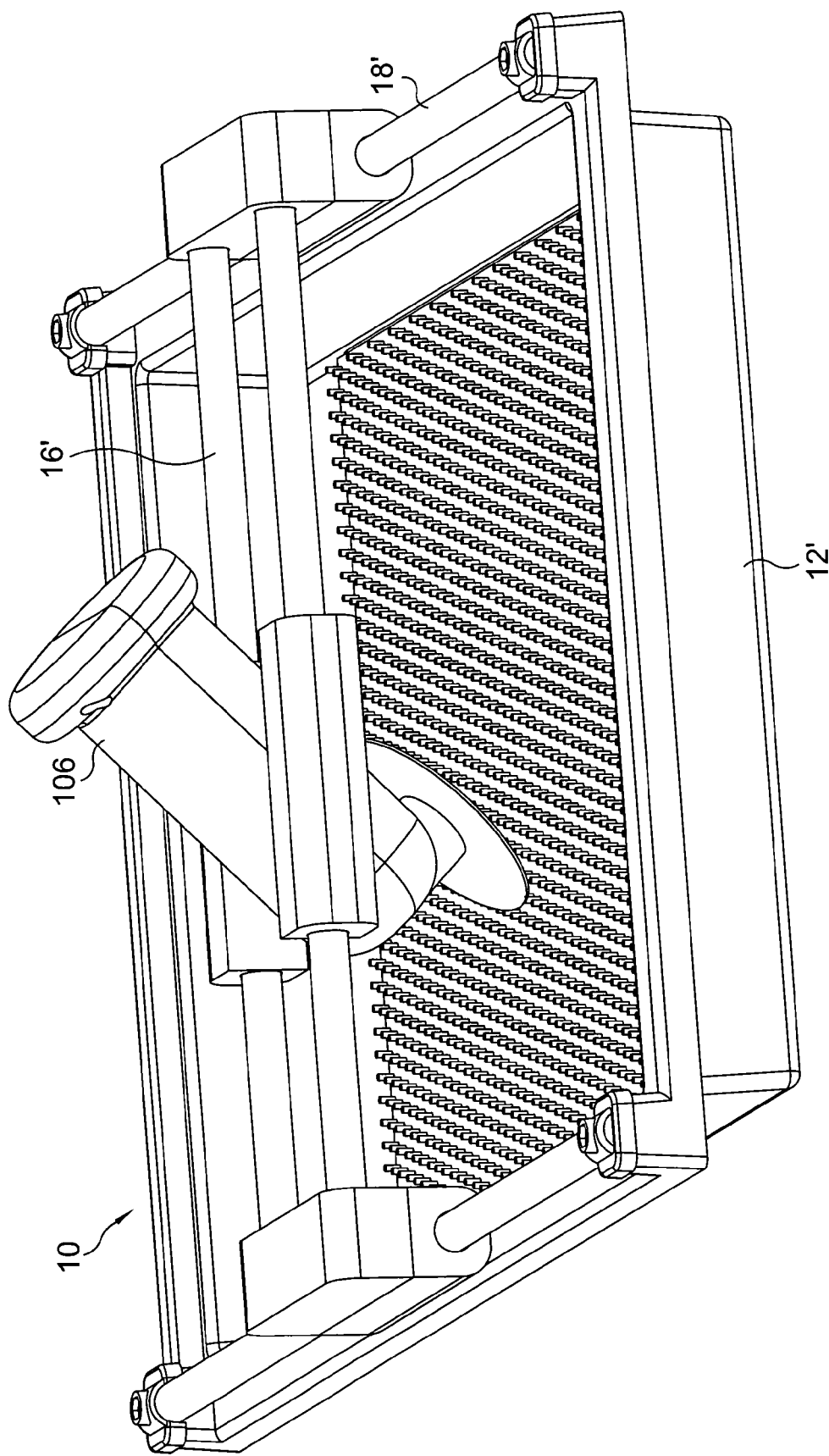
FIG. 20 is a perspective view of the tile cutting machine of FIG. 19, but showing the cutting head assembly rotated so the blade can produce a bevel cut.
Figure 21:
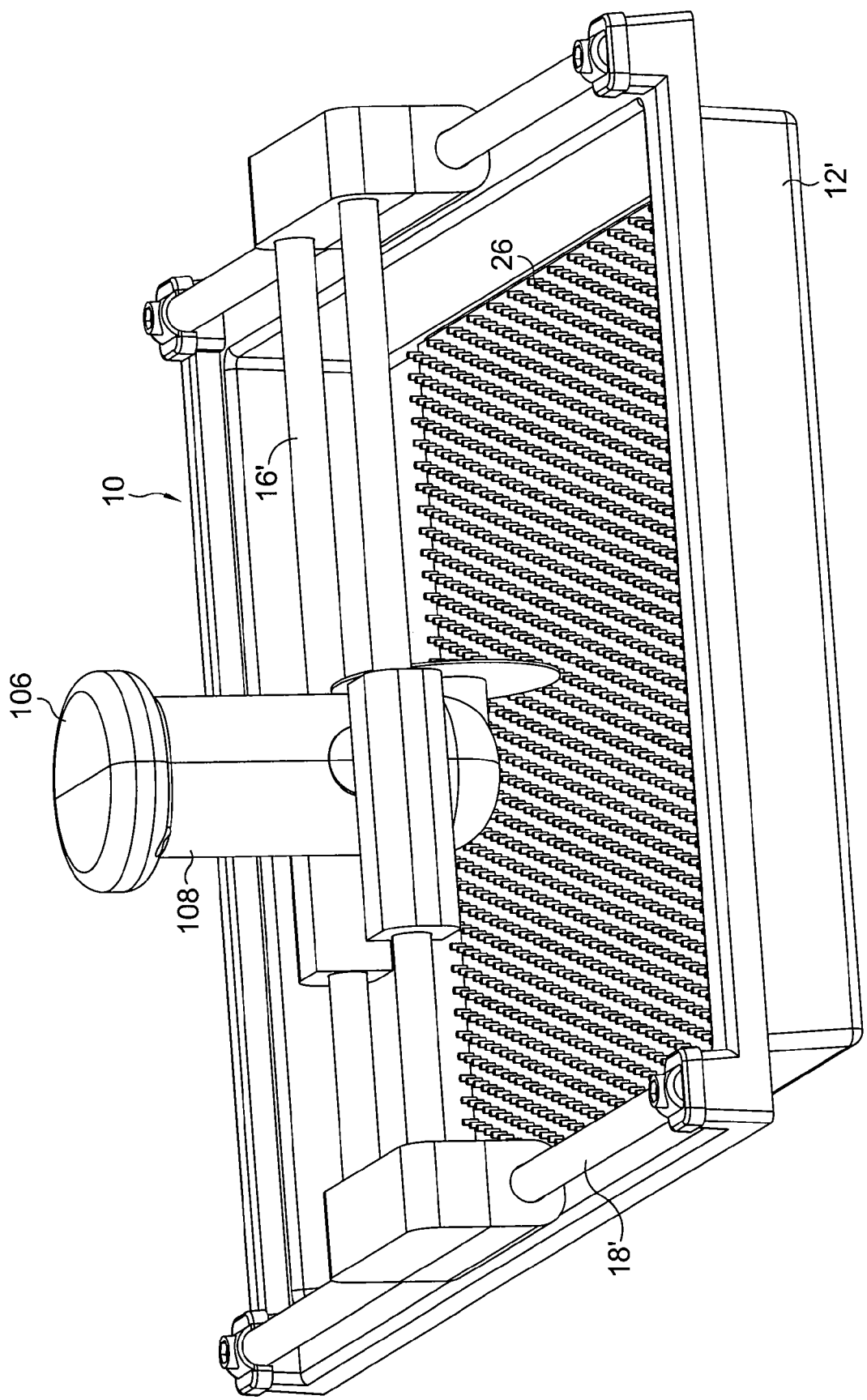
FIG. 21 is a perspective view of a tile cutting machine in accordance with a third embodiment of the present invention with the cutting head assembly in a raised position.
Figure 22:
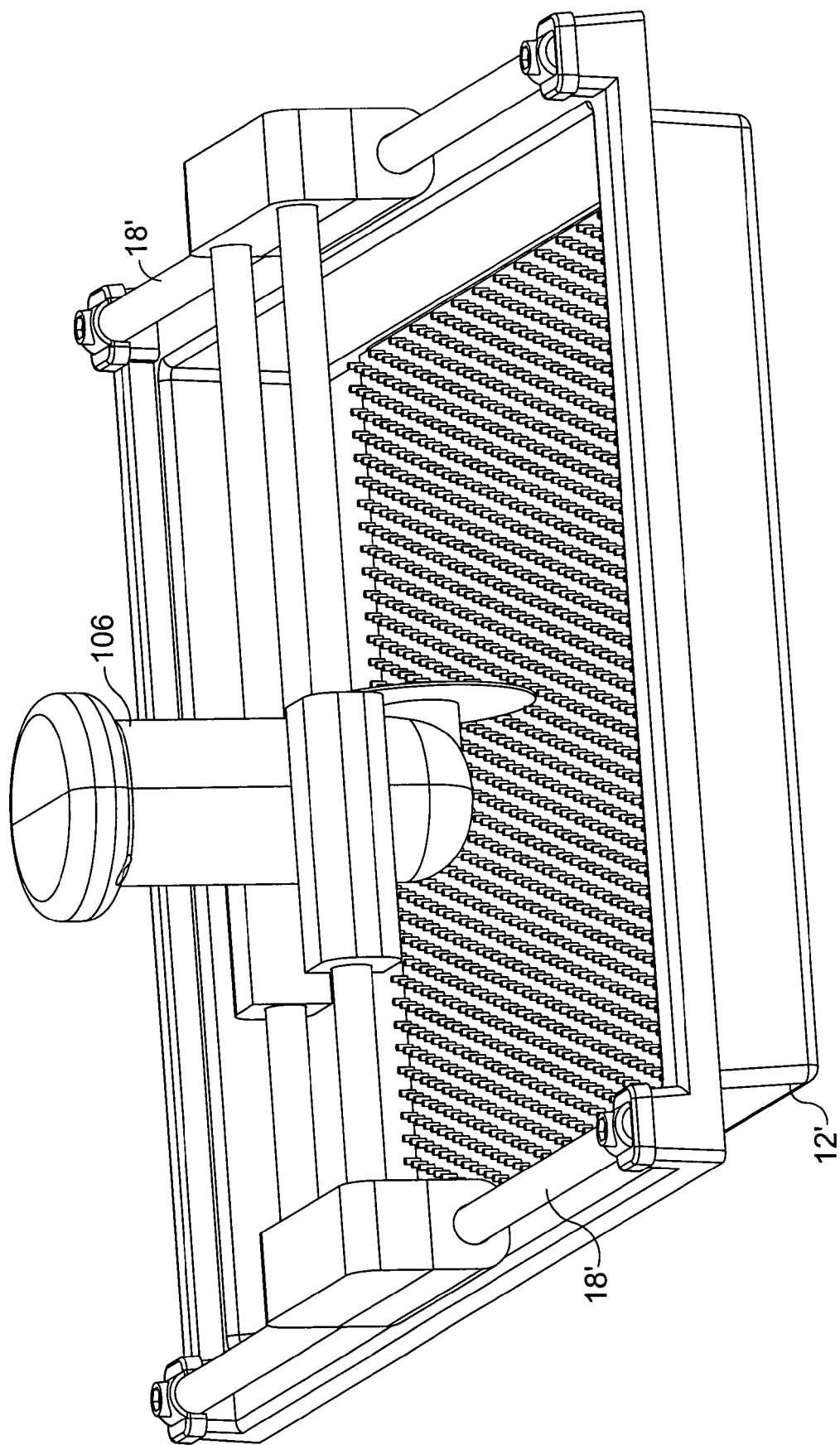
FIG. 22 is a perspective view of the tile cutting machine of FIG. 21, but showing the cutting head assembly in a lowered position to make a plunge cut.

In yet another embodiment, illustrated in FIGS. 19 and 20, the cutting head assembly 14' permits rotation of the cutting blade 46 from the vertical orientation illustrated in FIG. 19 to the tilted or angled orientation illustrated in FIG. 20 to allow the tile cutting machine 10 to make bevel cuts in tiles. A height adjustment mechanism in cutting head assembly 14' allows for the tilted blade 46 to be lowered such that the bevel cut goes all the way through the tile being cut. The height adjustment mechanism in the cutting head assembly 14' also allows for the blade 46 to be raised and lowered while in a vertical orientation, as illustrated in FIGS. 21 and 22, respectively, to permit the operator to make a plunge cut in a tile.

FIGS. 19-22 also illustrate one possible version of the above-discussed alternate embodiment were the cutting head assembly 14 is modified such that a stand alone cutting tool 106 replaces the motor 48 and the casing 44 as it provides its own self contained motor in its own housing 108. Here, a pair of cross rail bearing housings 110 are supported on the cross rails 76 and are selectively coupled to the housing 108 of the stand alone cutting tool 106. The stand alone cutting tool 106 is selectively uncoupleable from the cross rail bearing housings 110 to permit it to be used as a hand held power tool.

FIGS. 23-32 illustrate a third embodiment of a tile cutting machine in accordance with the present invention. The tub 12", which may be molded from a hard plastic resin or fiberglass, is preferably formed as a single unit. The tub 12" has feet 112 so that the tub 12" may be placed on an uneven surface. Posts 114 are formed in the tub 12" at its corners for supporting ends 86, 88 of the side rails 84. Caps 116, having a bolt 118 passing therethrough, may be used to secure the side rails 84 to the posts 114. The back right cap 116 has been removed to provide greater detail of the arrangement. The caps 116 and bolts 118 allow the side rails 84 to be uncoupled from the tub 12".

Figure 25:
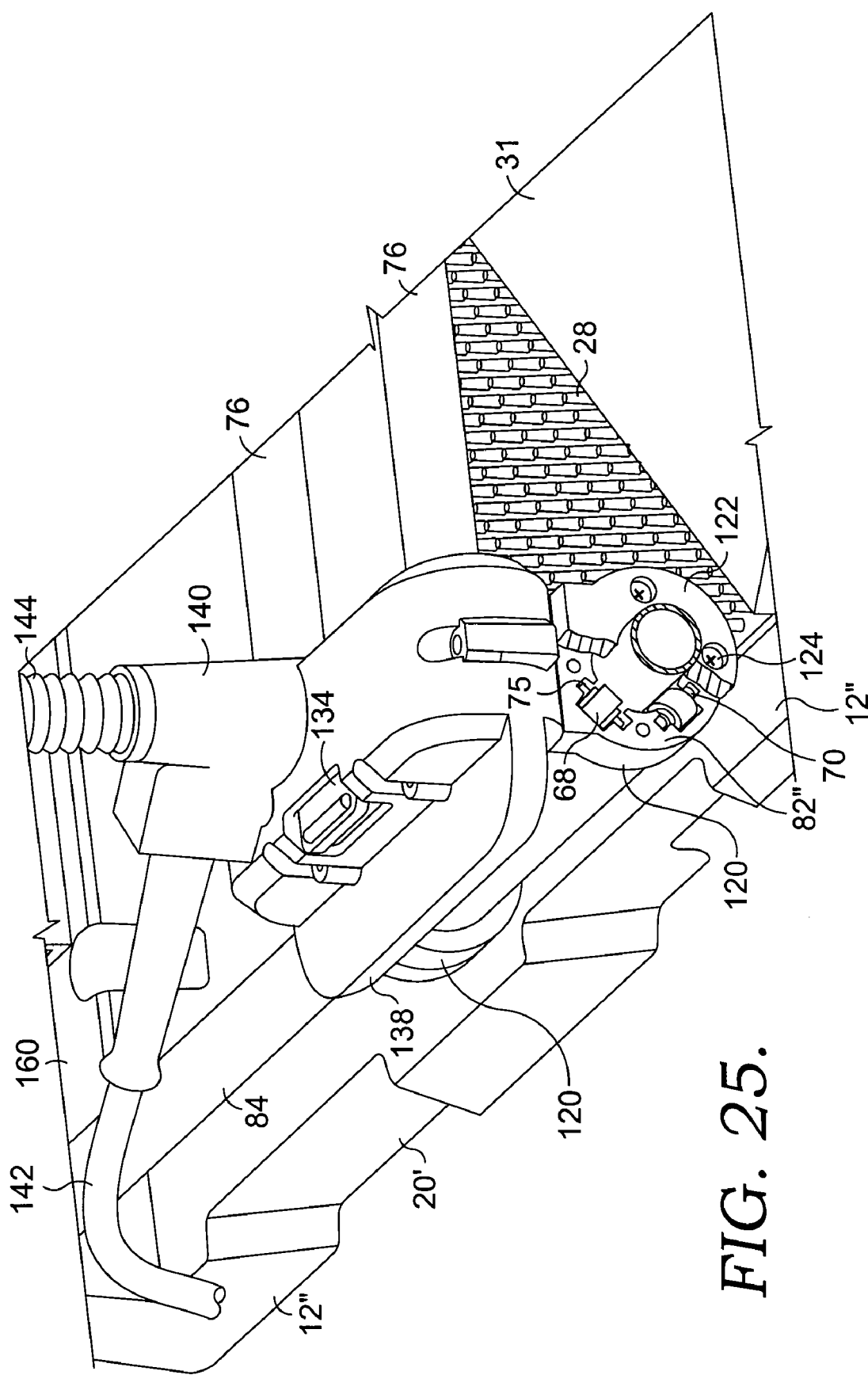
FIG. 25 is an enlarged fragmentary perspective view of a portion of the tile cutting machine of FIG. 23, with a portion of a bearing plate cut away to reveal some roller bearings.

Received on the side rails 84 are side rail bearing housings 82". As illustrated in FIG. 25, the side rail bearing housings 82" include both forward and rearward bearing portions 120 that include roller bearings 68. The axle pins 70 of the roller bearings 68 are maintained in their respective slots 75 by bearing plates 122 which may be secured onto the ends of the side rail bearing housings 82" by screws 124.

Figure 26:
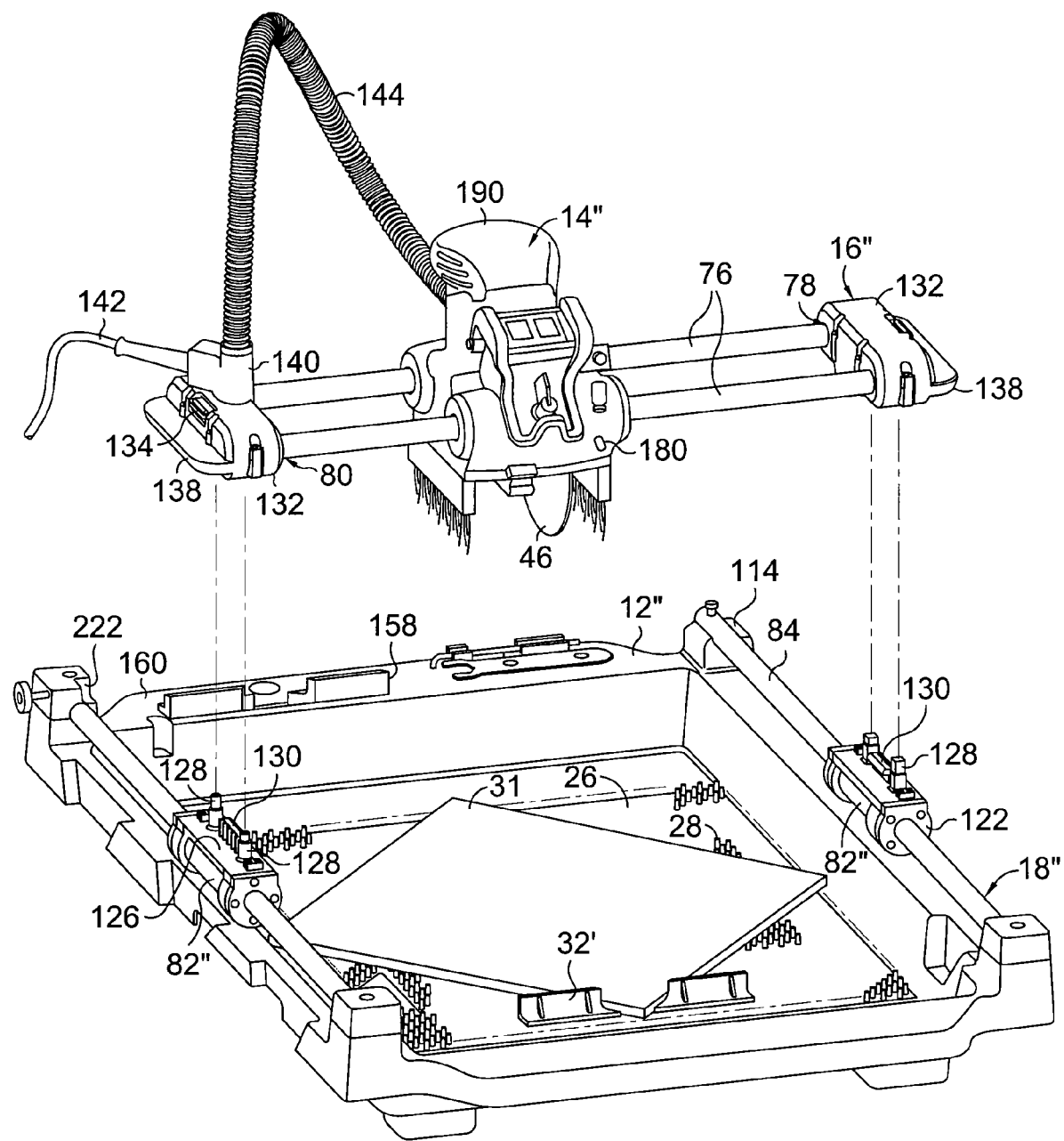
FIG. 26 is a perspective view of the tile cutting machine of FIG. 23, illustrating the ability to remove the cutting head assembly and cross rails from the tub and side rails.
Figure 27:
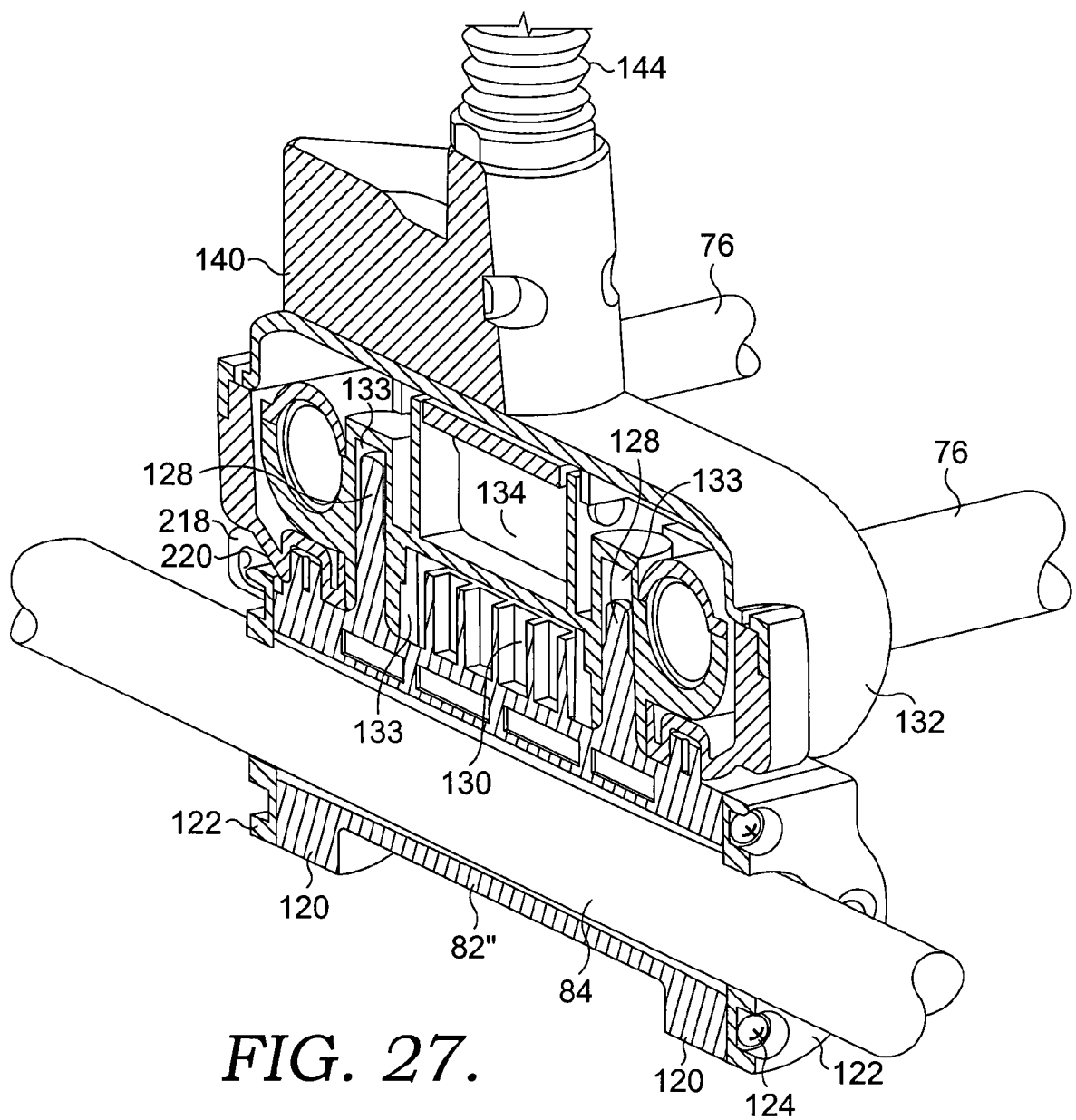
FIG. 27 is a fragmentary perspective view of the tile cutting machine of FIG. 25, with a portion thereof in cross-section to illustrate the coupling between the cross rails and side rails.
Figure 28:
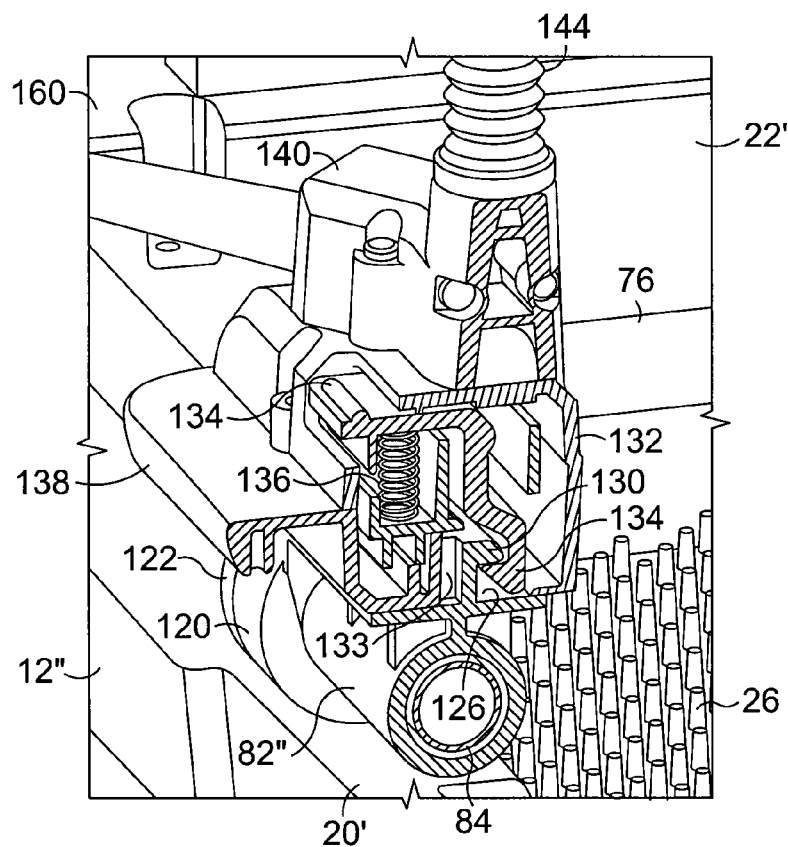
FIG. 28 is a view similar to that of FIG. 27, but with the cross-section in an alternate plane to further illustrate the coupling between the cross rails and side rails.
Figure 29:
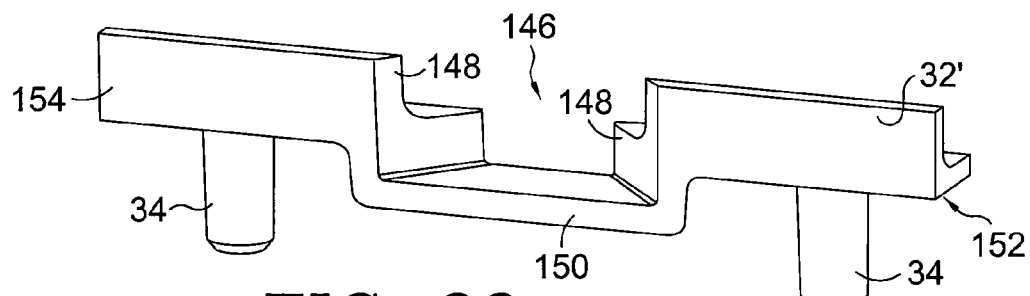
FIG. 29 is a perspective view of a second embodiment of a fence of the present invention.

The side rail bearing housings 82", as illustrated in FIG. 26, include a generally planar upper portion 126. Extending upwardly from the upper portion 126 are a pair of alignment posts 128 and a hook 130. The alignment posts 128 and the hooks 130 are received in end caps 132 of the cross rail system 16". The end caps 132 receive the distal ends 78, 80 of the cross rails 76. The end caps 132 include openings 133 in their bottom surface for receiving the alignment posts 128 and the hooks 130. The end caps 132 include a latch 134 which cooperates with the hook 130 to selectively couple and uncouple the cross rail system 16" with the side rail system 18". The latch 134 of the end caps 132 is biased to a latching position by a spring 136 positioned within the end caps 132, as illustrated in FIG. 28.

To uncouple the cross rail assembly 16" from the side rail assembly 18", as illustrated FIG. 26, a user grabs the two end caps 132 with their hands, pushes down on the latches 134 with their thumbs while their fingers are underneath handle portions 138 of the end caps 132. This moves the latches 134 out of cooperation with the hooks 130, thereby permitting the user to lift the cross rail system 16" upwardly. The tub 12" can now be flipped over or sprayed out without fear of getting the cutting head assembly 14" wet and/or the blade 46 can be readily accessed for changing. To recouple the cross rail system 16" with the side rail system 18", the user simply places the end caps 132 over the side rail bearing housings 82" such that the alignment posts 128 align with the openings 133 in the bottom of the end caps 132 and lowers the cross rail system 16" back down onto the side rail system 18" until the latches 134 catch on the hooks 130.

The end cap 132 on the left side of the tile cutting machine 10" includes a cord housing 140 through which electrical wires (not pictured) pass to power the motor 48 of the cutting head assembly 14". A power cord 142 leads from the cord housing 140 and terminates in a plug (not shown) which may be plugged into a power outlet to power the motor 48. The electrical wires leading from the cord housing 140 to the cutting head assembly 14" are preferably enclosed in a cord tube 144. The cord tube 144 keeps the electrical wires from becoming pinched during operation and from coming into contact with the water contained in the tub 12" or that may be splashed out of the tub 12" during operation. While the motor 48 of the cutting head assembly 14" has been discussed and illustrated as one that gets power via a cord plugged into a power outlet (e.g., a standard 110V AC grounded outlet), a cordless version, where the motor is powered by a rechargeable battery pack (e.g., 18V or 24V DC), is within the scope of the present invention.

The fence 32" in this embodiment, has been significantly altered. The fence 32" still includes a pair of downward projections 34 which are receivable in holes 36 in the holding mat 26. However, the fence 32" has a cutout portion 146 in the middle thereof for receiving a corner of a tile 31 to be cut as described in more detail below. The cutout portion includes vertical walls 148 which are preferably at a 90° angle with respect to one another. The vertical walls 148 are joined by a recessed bridge 150. The fence 32" also has a lower mat engaging surface 152 and a side tile engaging face 154. To accommodate the recessed bridge 150 of the fence 32", the holding mat 26 is also provided with a recess 156, preferably in the shape of an isosceles trapezoid, intermediate two holes 36. The projections 34 and the holes 36 are preferably tapered to provide for a friction fit therebetween.

Figure 23:
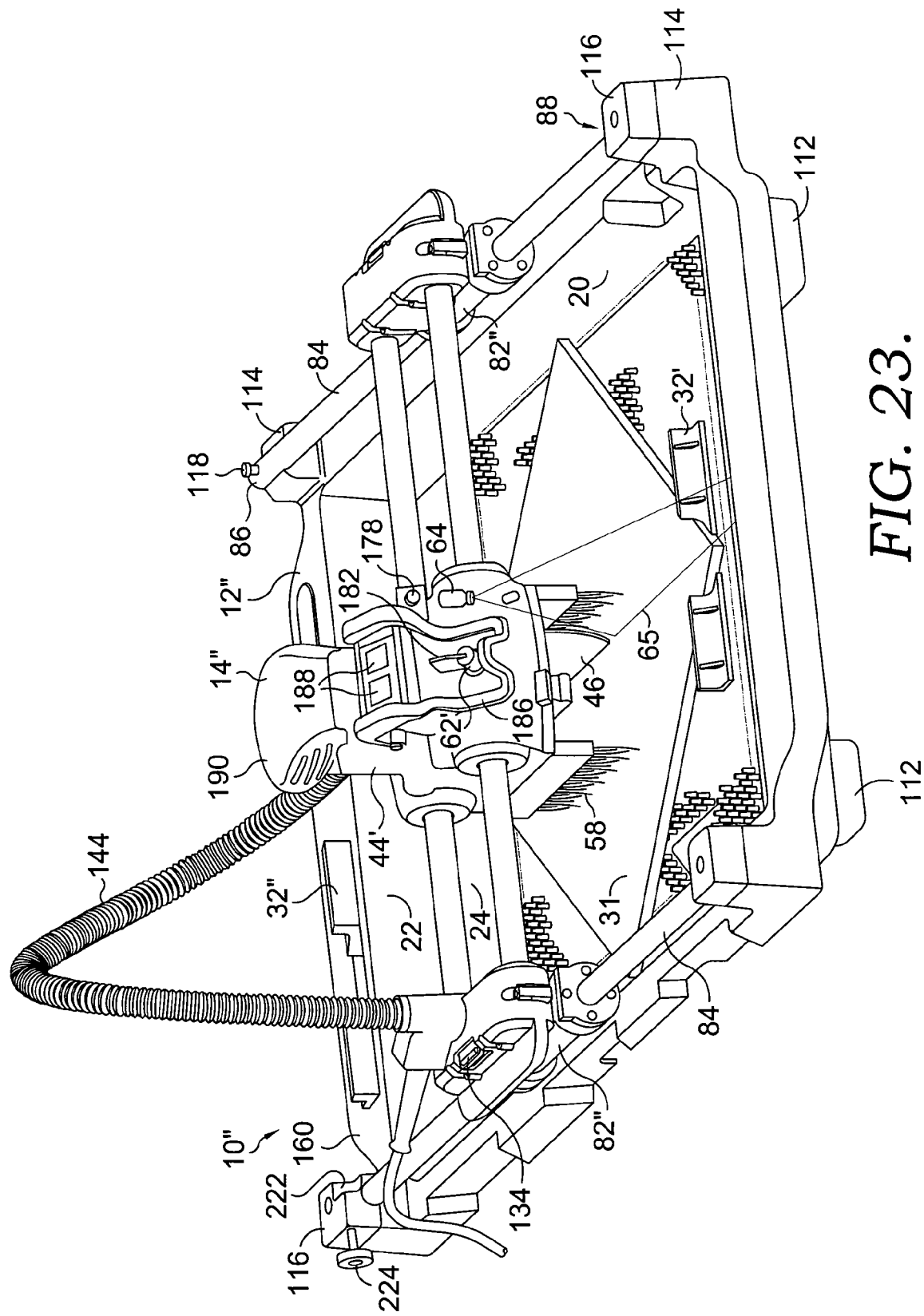
FIG. 23 is a perspective view of a tile cutting machine in accordance with a third embodiment of the present invention.
Figure 24:
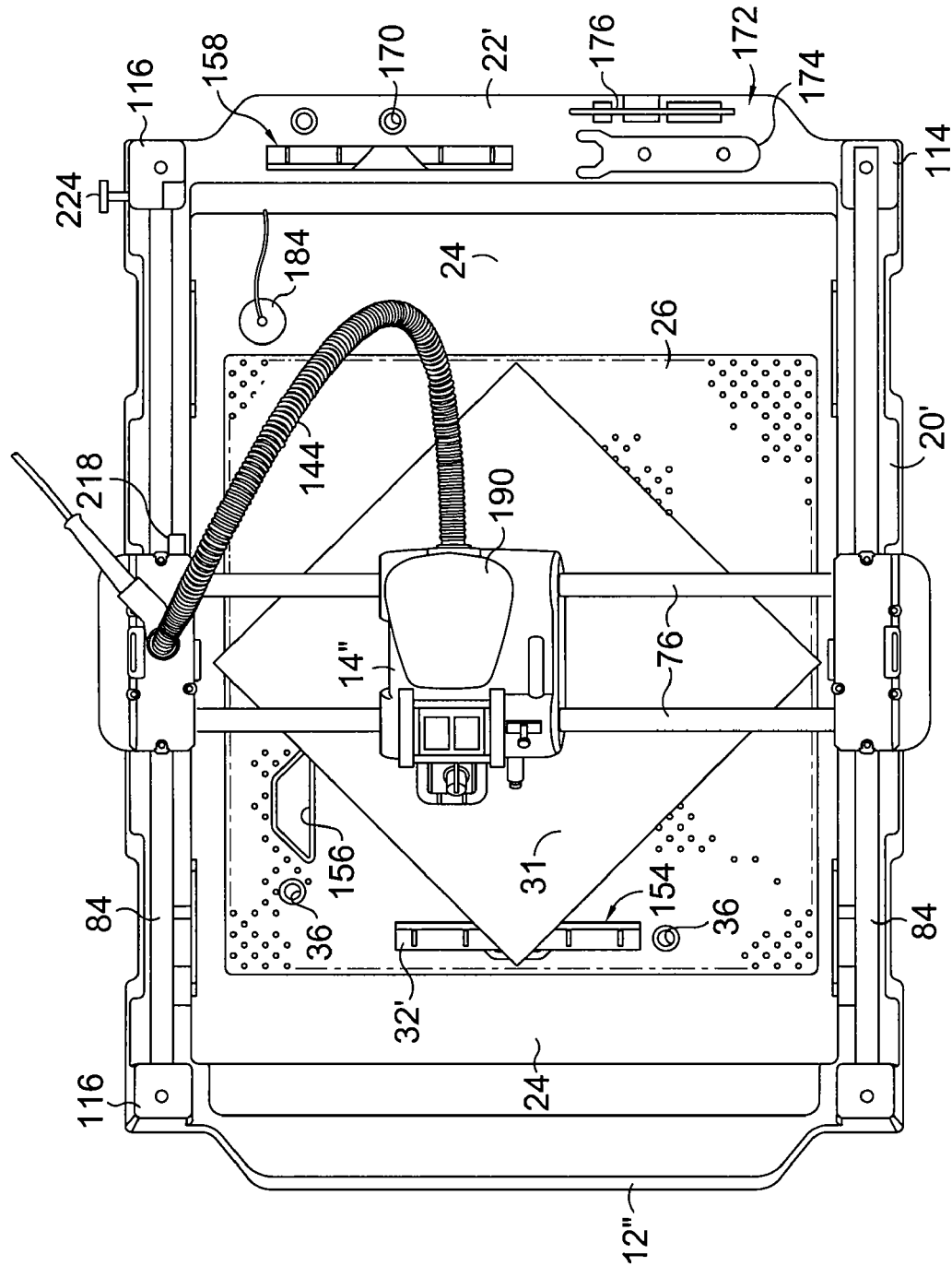
FIG. 24 is a plan view of the tile cutting machine of FIG. 23.

In use, the user may place the fence 32" along a left or right edge of the holding mat 26 or along a front edge of the holding mat 26, as illustrated in FIGS. 23, 24 and 26. A straight edge of a tile 31 may then be butted up against the side tile engaging face 154 of the fence 32" to perform a cut which would be perpendicular to the straight edge of the tile 31 abutting the fence 32", if the fence 32" is positioned along the forward edge as illustrated. Alternately, the user may place a corner of the tile 31 in the cutout portion 146 in the manner illustrated to make a cut that is at a 45° angle to the edges of the tile placed in the cutout portion 146. The recessed bridge 150 is positioned in the recess 156 and into the holding mat 26, thereby permitting the blade 46 to pass there over during the cutting process without cutting the fence 32". A fence storage area 158 can be molded into the tub 12" by providing correspondingly shaped holes and a recess therein. In the illustrated embodiment, the fence storage area 158 has been molded into an upper lip 160 of the back or end wall 22' of the tub 12". The lower mat engaging surface 152 rests on the tops of the nubs 28, just like a tile 31.

Figure 30:
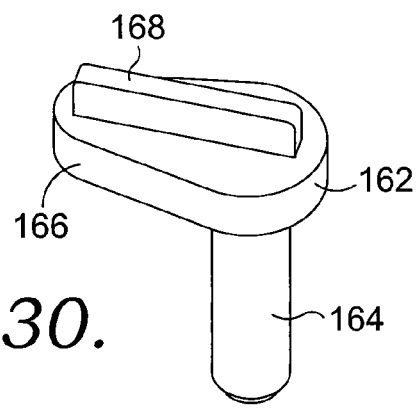
FIG. 30 is a perspective view of a hold down of the present invention.

Instead of using the fence 32", or in combination with using the fence 32", the user may employ a tile hold down 162 of the type illustrated in FIG. 30. The tile hold down 162 has a downwardly depending post 164 of similar size and shape to the projections 34 on the fence 32". The tile hold down 162 also includes a body 166, of which a portion of a lower surface thereof engages an upper surface of a tile 31 during use. A flange 168 may be provided on an upper surface of the body 166 to permit the user to easily withdraw the tile hold down 162 from receipt in one of the holes 36 in the holding mat 26. The tile hold downs 162 may be positioned in corresponding holes 170 formed in the upper lip 160 of tub 12" for storage. The tile hold downs 162 can be used to assist with a "hands free" operation of the tile cutting machine 10 where the user does not have to hold the tile 31 down with a hand during the cutting process. A tool storage area 172 can also be formed in the tub 12". As illustrated in FIG. 24, the upper lip 160 of the back end wall 22 of the tub 12" includes a place for storing a wrench 174, which can be used for changing the blade 46, and an Allen wrench 176, for tightening various screws.

Another difference in this embodiment include the presence of a button or switch 178 on the cutting head assembly 14" for selectively activating the laser 64 and/or a light, such as an LED 180. The laser 64 and LED 180 may be powered by a battery (not shown) housed within the casing 44' of the cutting head assembly 14".

In this embodiment, an alternate cutting head assembly lock 62' is also provided. In a previous embodiment, such as that illustrated in FIG. 1, the cutting head assembly lock 62 took the form of a bolt having a user engageable knob thereon. To lock the position of the cutting head assembly 14 along the cross rails 76, the user would simply turn the knob and thereby tighten the bolt until its end engaged the cross rail 76. In this alternate embodiment, the cutting head assembly lock 62', as best illustrated in FIGS. 31 and 32, includes a user engageable lever portion 182. With the lever portion 182 pointed to the left, the cutting head assembly 14" is free to slide back and forth from side to side along the cross rails 76. A simple turn of the lever portion 182 to the right causes a U-shaped clamp 192 positioned within the casing 44' to tighten around the front cross rail 76, thereby preventing lateral movement of the cutting head assembly 14". By tightening the clamp around the cross rail 76, as opposed to having a bolt directly engage the cross rail as in the previous embodiment, marring of the cross rail 76 by the cutting head assembly lock 62' can be avoided.

The U-shaped clamp 192 includes an upper section 194 and a lower section 196 that are pivotally connected by a pin 198. Both the upper and lower sections 194, 196 include a pad 200 for engaging the cross rail 76. A bolt 202 is positioned through the distal ends of the clamp sections 194, 196 and a nut 204 is received thereon. A spring 206 is received on the bolt 202 and is positioned intermediate the distal ends of the clamp sections 194, 196 to bias the U-shaped clamp 192 to an open position. Recesses 208 in the upper and lower sections 194, 196 of the U-shaped clamp 192 receive the spring 206.

Coupled with the lever portion 182 is a body portion 210 that includes a recess 212 for receiving the nut 204. A flange 214 on the body portion 210 is received in a groove 216 in the casing 44' to couple the body portion 210 therewith. As a user rotates the lever portion 182 clockwise, the body portion 210 rotates the nut 204 against the pressure of the spring 206, thereby moving the distal ends of the clamp sections 194, 196 together and clamping the cross rail 76 between the pads 200 which prevents lateral movement of the cutting head assembly 14" during use of the tile cutting machine 10. When lateral movement is desired, the user simply rotates the lever portion 182 counterclockwise, thereby loosening nut 204 and allowing the spring 206 to move the distal ends of the clamp sections 194, 196 away from each other until the pads 200 no longer provide sufficient clamping strength on the cross rail 76.

In addition to providing the cutting head assembly lock 62' that prevents lateral movement of the cutting head assembly 14", the third embodiment has also been provided with a cross rail locking mechanism to prevent movement of the cross rail system 16" along the side rail system 18" during transportation of the tile cutting machine 10. To provide the cross rail locking mechanism, the rear bearing plate 122' of the left side rail bearing housing 82" has been provided with a projection 218 that extends rearwardly therefrom and includes an eye 220 therethrough. When transportation of the tile cutting machine 10 is desired, the user may simply move the cross rail system 16" all the way back to the rear of the tub 12". Before the rear bearing plate 122' abuts the back left post 114, the projection 218 is received in a notch 222 in the back left cap 116 whereby a pin 224 in the cap 116 may be pushed through the eye 220 of the projection 218 to secure the cross rail system 16" at the back of the tub 12".

Other modifications can be made to the tub. For example, the bottom 24 of the tub 12" has been provided with a drain plug 184 to permit a user to drain excess water and/or sediment from the tub 12". Another modification in the third embodiment is the inclusion of a roll bar 186 mounted on the outside of the casing 44' of the cutting head assembly 14". The roll bar 186 protrudes outwardly from the casing 44' in various locations to protect various elements, such as the lever portion 182 of the cutting head assembly lock 62' and on/off buttons 188, from damage should the cutting head assembly 14" be dropped upside down. The casing 44" is provided with a user engageable gripping portion 190 that the user may grab with their hand to pull the cutting assembly 14" from the back of the tub 12" towards the front of the tub 12" during a cutting operation. Further, in addition to bristle skirts 58 being positioned around a bottom of the cutting head assembly 14", a "mud flap" 191, consisting of a flexible rubber piece, may be mounted to extend down from the casing 44' directly behind the blade 46 to keep water from spraying out of the cutting area (i.e., the area enclosed by the bristle skirts 58, around the blade 46, and under the casing 44') during use.

Turning back to the embodiment of the tile cutting machine illustrated in FIG. 1, in operation, a tile is placed on the raised nubs 28 with a pool of water retained in the tub 12 underneath the tile. If the user chooses to use a fence 32 for aligning the tile, the tile is placed against the fence 32. The blade 46 on the cutting head assembly 14 is set at a depth which allows full penetration through the tile and into contact with the water to provide lubrication, cooling, and dust control. The cutting head assembly 14 is positioned for cutting the tile to a desired width by being moved laterally across the cross rails 76 and locked in position using the cutting head assembly lock 62. The laser 64 and scale may be used to facilitate proper aligning of the cutting head assembly 14 for cutting the tile. The user then moves the cutting head assembly 14 along the side rails 84 and the length of the tub 12, preferably from the back to the front via a pulling motion, to engage the tile and perform the cut. By having water contained in and sitting in the bottom of the tub 12, the tile cutting machine 10 eliminates the need for a pump to spray water on the blade 46 during use. The blade 46 picks up water from the tub during use to cool the blade and lubricate the cut. A separate pump, however, may of course be added to and implemented with the present invention.

The present invention has been described in relation to particular embodiments, which are intended in all respects to be illustrative rather than restrictive. Alternative embodiments will become apparent to those of ordinary skill in the art to which the present invention pertains without departing from its scope. Substitutions may be made and equivalents employed herein without departing from the scope of the invention as recited in the claims. It will be understood that certain features and subcombinations are of utility and may be employed without reference to other features and subcombinations. This is contemplated and within the scope of the claims.

The invention claimed is:

1. A tool support assembly for holding a power tool, the assembly comprising:
    a pair of side rails spaced apart from each other and generally parallel to each other;
    each side rail having a bearing housing movably received thereon, wherein the bearing housings include a passage there through, wherein the bearing housings are received on the side rails by the side rails passing through the passages, and wherein the bearing housings have a plurality of roller bearings therein which partially extend into the passage and ride along the side rails;
    a pair of cross rails spaced apart from each other and generally parallel to each other, wherein the cross rails are generally perpendicular to the side rails and extend there between, wherein each of the cross rails has a pair of opposed ends, wherein one set of ends are received in one of the bearing housings, and wherein the other set of ends are received in the other bearing housing; and
    a casing for holding a power tool, wherein the casing includes a pair of passages there through, wherein each of the passages include a plurality of roller bearings therein which partially extend into the passages, and wherein the casing is supported on the cross rails for lateral movement there along between the side rails by one of the cross rails being received in one of the passages through the casing and the other cross rail being received in the other of the passages through the casing, wherein the bearing housings on the side rails have an upper portion and a lower portion, wherein the passages are in the lower portions, and wherein the upper and lower portions are selectively coupleable and uncoupleable with each other, whereby the cross rails with the casing there between can be removed from being coupled with the side rails.

2. The assembly of claim 1, wherein bearing housings have a latch for selectively coupling the upper and lower portions together.

3. The assembly of claim 1, wherein the cross rails are received in the upper portions of the bearing housings, wherein the cross rails are in a first horizontal plane, wherein the side rails are in a second horizontal plane, wherein the first plane is above the second plane, and wherein the upper portions of the bearing housings rest on top of and are supported by the lower bearing housings when the upper and lower bearing housings are coupled together.

4. A tool support assembly for holding a power tool, the assembly comprising:
    a pair of side rails spaced apart from each other and generally parallel to each other;
    each side rail having a bearing housing movably received thereon, wherein the bearing housings include a passage there through, wherein the bearing housings are received on the side rails by the side rails passing through the passages, and wherein the bearing housings have a plurality of roller bearings therein which partially extend into the passage and ride along the side rails;
    a pair of cross rails spaced apart from each other and generally parallel to each other, wherein the cross rails are generally perpendicular to the side rails and extend there between, wherein each of the cross rails has a pair of opposed ends, wherein one set of ends are received in one of the bearing housings, and wherein the other set of ends are received in the other bearing housing; and
    a casing for holding a power tool, wherein the casing includes a pair of passages there through, wherein each of the passages include a plurality of roller bearings therein which partially extend into the passages, and wherein the casing is supported on the cross rails for lateral movement there along between the side rails by one of the cross rails being received in one of the passages through the casing and the other cross rail being received in the other of the passages through the casing, wherein the casing includes a lock for selectively restricting lateral movement of the casing along the cross rails, wherein the lock includes a clamp and a lever, wherein the clamp is U-shaped and one of the cross rails passes there through, and wherein rotation of the lever in a first direction causes the clamp to tighten around the cross rail.

5. The assembly of claim 4, further comprising a power tool releasably coupled with the casing, whereby the power tool can be uncoupled from the assembly and used separately.

6. The assembly of claim 4, wherein the casing further includes a power tool built therein.

7. A tool support assembly for holding a power tool, the assembly comprising:
    a pair of side rails spaced apart from each other and generally parallel to each other;
    each side rail having a bearing housing movably received thereon, wherein the bearing housings include a passage there through, wherein the bearing housings are received on the side rails by the side rails passing through the passages, and wherein the bearing housings have a plurality of roller bearings therein which partially extend into the passage and ride along the side rails;
    a pair of cross rails spaced apart from each other and generally parallel to each other, wherein the cross rails are generally perpendicular to the side rails and extend there between, wherein each of the cross rails has a pair of opposed ends, wherein one set of ends are received in one of the bearing housings, and wherein the other set of ends are received in the other bearing housing; and
    a casing for holding a power tool, wherein the casing includes a pair of passages there through, wherein each of the passages include a plurality of roller bearings therein which partially extend into the passages, and wherein the casing is supported on the cross rails for lateral movement there along between the side rails by one of the cross rails being received in one of the passages through the casing and the other cross rail being received in the other of the passages through the casing, wherein the casing further includes a power tool built therein,
    wherein one of the bearing housings further includes a cord housing through which electrical wires may pass, and wherein the assembly further includes a cord tube, and wherein the cord tube extends from the cord housing to the casing, whereby electrical wires may be received in the cord tube and supply electrical power to a power tool in the casing.

8. A tool support assembly for holding a power tool, the assembly comprising:

a pair of side rails spaced apart from each other and generally parallel to each other;

each side rail having a bearing housing movably received thereon, wherein the bearing housings include a passage there through, wherein the bearing housings are received on the side rails by the side rails passing through the passages, and wherein the bearing housings have a plurality of roller bearings therein which partially extend into the passage and ride along the side rails;

a pair of cross rails spaced apart from each other and generally parallel to each other, wherein the cross rails are generally perpendicular to the side rails and extend there between, wherein each of the cross rails has a pair of opposed ends, wherein one set of ends are received in one of the bearing housings, and wherein the other set of ends are received in the other bearing housing;

a casing for holding a power tool, wherein the casing includes a pair of passages there through, wherein each of the passages include a plurality of roller bearings therein which partially extend into the passages, and wherein the casing is supported on the cross rails for lateral movement there along between the side rails by one of the cross rails being received in one of the passages through the casing and the other cross rail being received in the other of the passages through the casing; and a tub for receiving water therein, the tub having a bottom and four sidewalls, wherein the side rails are supported above and generally parallel to two of the sidewalls, wherein the cross rails extend over the bottom of the tub, wherein a user may move the casing side to side along the cross rails, and wherein a user may move the casing front to back along the side rails, thereby permitting movement of a power tool in the casing over a majority of the bottom of the tub to cut a work piece positioned therein.

9. A tool support assembly for holding a power tool, the assembly comprising:

a pair of side rails spaced apart from each other and generally parallel to each other;

each side rail having a bearing housing movably received thereon, wherein the bearing housings include a passage there through, wherein the bearing housings are received on the side rails by the side rails passing through the passages, and wherein the bearing housings have a plurality of roller bearings therein which partially extend into the passage and ride along the side rails;

a pair of cross rails spaced apart from each other and generally parallel to each other, wherein the cross rails are generally perpendicular to the side rails and extend there between, wherein each of the cross rails has a pair of opposed ends, wherein one set of ends are received in one of the bearing housings, and wherein the other set of ends are received in the other bearing housing; and a casing for holding a power tool, wherein the casing includes a pair of passages there through, wherein each of the passages include a plurality of roller bearings therein which partially extend into the passages, and wherein the casing is supported on the cross rails for lateral movement there along between the side rails by one of the cross rails being received in one of the passages through the casing and the other cross rail being received in the other of the passages through the casing, wherein the bearing housings include at least four slots located therein that are spaced apart from the passage and are generally perpendicular to radial lines thereof, wherein the at least four slots each include an axle pin received therein, each axle pin having a wheel thereon to provide the roller bearings, wherein a portion of each of the wheels extend into the passage, wherein the wheels ride along an outer surface of the side rails when the bearing housings are moved along the side rails, wherein the bearing housings are elongate members having first and second ends, wherein the passages pass through the bearing housings from the first ends to the second ends along a longitudinal axis of the bearing housings, wherein the at least four slots are located in the first end, wherein four corresponding slots are located in the second end, wherein the four corresponding slots each include an axle pin received therein, each axle pin having a wheel thereon to provide additional roller bearings, wherein a portion of each of the eight wheels in each bearing housing extend into the passage, wherein the eight wheels ride along the outer surface of the side rails when the bearing housings are moved along the side rails, wherein the slots are disposed at 90-degree intervals about the bore, and wherein opposing slots are generally parallel to each other.

10. The assembly of claim 9, wherein the side rails are cylindrical, wherein the passages through the bearing housings are cylindrical, and wherein the slots are generally perpendicular to radial lines of the passages.

11. A tool support assembly for holding a power tool, the assembly comprising:

a pair of side rails spaced apart from each other and generally parallel to each other;

each side rail having a bearing housing movably received thereon, wherein the bearing housings include a passage there through, wherein the bearing housings are received on the side rails by the side rails passing through the passages, and wherein the bearing housings have a plurality of roller bearings therein which partially extend into the passage and ride along the side rails;

a pair of cross rails spaced apart from each other and generally parallel to each other, wherein the cross rails are generally perpendicular to the side rails and extend there between, wherein each of the cross rails has a pair of opposed ends, wherein one set of ends are received in one of the bearing housings, and wherein the other set of ends are received in the other bearing housing; and a casing for holding a power tool, wherein the casing includes a pair of passages there through, wherein each of the passages include a plurality of roller bearings therein which partially extend into the passages, and wherein the casing is supported on the cross rails for lateral movement there along between the side rails by one of the cross rails being received in one of the passages through the casing and the other cross rail being received in the other of the passages through the casing, wherein the casing further includes a laser beam operable to project a line of light downward onto a work piece to illustrate a projected cutting path of a power tool in the casing and wherein the casing further includes an LED for projecting light downward onto a work piece to illuminate a cutting area.

* * * * *